(12) United States Patent
Kameda

(10) Patent No.: US 9,210,661 B2
(45) Date of Patent: Dec. 8, 2015

(54) METHOD OF CONTROLLING POWER IN A WIRELESS COMMUNICATION SYSTEM

(71) Applicant: FUJITSU LIMITED, Kawasaki-shi, Kanagawa (JP)

(72) Inventor: Akihiro Kameda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 4 days.

(21) Appl. No.: 14/295,133

(22) Filed: Jun. 3, 2014

(65) Prior Publication Data

US 2015/0011174 A1 Jan. 8, 2015

(30) Foreign Application Priority Data

Jul. 3, 2013 (JP) ................................. 2013-139634

(51) Int. Cl.
*H04B 1/38* (2015.01)
*H04M 11/04* (2006.01)
(Continued)

(52) U.S. Cl.
CPC ................................. *H04W 52/0254* (2013.01)

(58) Field of Classification Search
CPC ............ H04W 4/20; H04W 4/22; H04B 3/54; H04B 3/56; H04B 2203/5437; H04B 2203/5441; H04B 2203/5445
USPC ................. 455/402, 404.1, 404.2, 41.1, 41.2, 455/571–574, 270; 700/286, 291–297
See application file for complete search history.

(56) References Cited

U.S. PATENT DOCUMENTS

2005/0136972 A1* 6/2005 Smith et al. ................ 455/554.1
2008/0242371 A1* 10/2008 Chiba et al. .................... 455/574
2009/0035609 A1* 2/2009 Ludtke ............................ 429/10
(Continued)

FOREIGN PATENT DOCUMENTS

| JP | 2005-277528 A | 10/2005 |
|---|---|---|
| JP | 2009-112155 A | 5/2009 |
| JP | 2009-117129 A | 5/2009 |

OTHER PUBLICATIONS

3GPP TS 36.300 V8.3.0, "3rd Generation Partnership Project; Technical Specification Group Radio Access Network; Evolved Universal Terrestrial Radio Access (E-UTRA) and Evolved Universal Terrestrial Radio Access Network (E-UTRAN)," Dec. 2007, pp. 1-120.

(Continued)

*Primary Examiner* — San Htun
(74) *Attorney, Agent, or Firm* — Arent Fox LLP

(57) ABSTRACT

A wireless base station apparatus includes a determination unit configured to make a determination as to whether an amount of power in the terminal device is to be reduced, and a control information transmission unit configured to transmit control information indicating power control to the terminal device, based on a determination result of the determination unit, and a terminal device includes at least one outlet unit configured to be able to supply power to an external device, a measurement unit configured to acquire the measurement value by measuring power in the terminal device, a measurement information transmission unit configured to transmit the measurement information indicating the measurement value to the wireless base station apparatus, a control information reception unit configured to receive the control information from the wireless base station apparatus, and a power supply control unit configured to control supply of power, based on the received control information.

20 Claims, 19 Drawing Sheets

(51) Int. Cl.
  *G05D 3/12* (2006.01)
  *H04W 52/02* (2009.01)

(56) References Cited

U.S. PATENT DOCUMENTS

2009/0108680 A1 4/2009 Minemura
2010/0146308 A1* 6/2010 Gioscia et al. ............... 713/300
2012/0173177 A1* 7/2012 Nishiyama et al. ............ 702/62
2012/0239773 A1* 9/2012 Blustein et al. ............... 709/208

OTHER PUBLICATIONS

IEEE 802.11b Wireless LANs, "Wireless Freedom at Ethernet Speeds," pp. 1-14.

\* cited by examiner

FIG. 6

| TAP IDENTIFICATION INFORMATION | OUTLET IDENTIFICATION INFORMATION | DEVICE TYPE INFORMATION | PRIORITY INFORMATION | CONTROL AVAILABILITY INFORMATION | TERMINAL IDENTIFICATION INFORMATION |
|---|---|---|---|---|---|
| TAPID#1 | CID#1 | PERSONAL COMPUTER | MEDIUM | AVAILABLE | UID#1 |
| TAPID#1 | CID#2 | ELECTRIC WATER BOILER | HIGH | AVAILABLE | UID#1 |
| TAPID#1 | CID#3 | TELEVISION | LOW | AVAILABLE | UID#1 |
| TAPID#2 | CID#1 | REFRIGERATOR | HIGH | UNAVAILABLE | UID#2 |
| TAPID#2 | CID#2 | AIR CONDITIONER | MEDIUM | UNAVAILABLE | UID#1 |
| TAPID#2 | CID#3 | DESK LAMP | LOW | AVAILABLE | UID#1 |
| ... | ... | ... | ... | ... | ... |

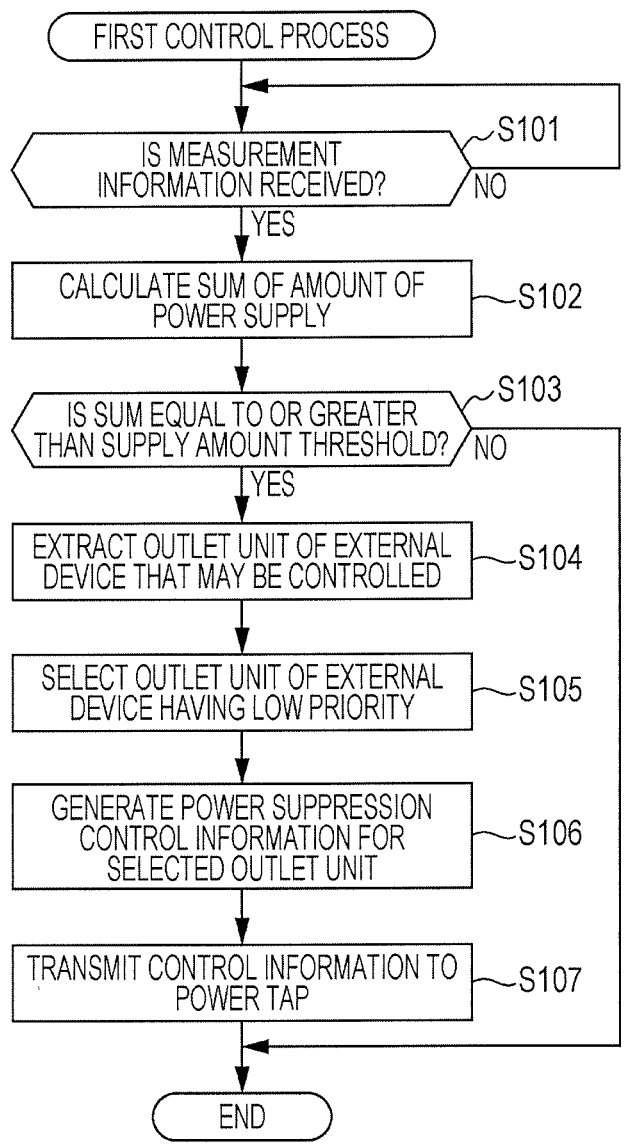

FIG. 9

| TAP IDENTIFICATION INFORMATION | OUTLET IDENTIFICATION INFORMATION | DEVICE TYPE INFORMATION | PRIORITY INFORMATION | CONTROL AVAILABILITY INFORMATION | TERMINAL IDENTIFICATION INFORMATION | INFORMATION ON MAXIMUM AMOUNT OF POWER |
|---|---|---|---|---|---|---|
| TAPID#1 | CID#1 | PERSONAL COMPUTER | MEDIUM | AVAILABLE | UID#1 | 120 W |
| TAPID#1 | CID#2 | ELECTRIC WATER BOILER | HIGH | AVAILABLE | UID#1 | 700 W |
| TAPID#1 | CID#3 | TELEVISION | LOW | AVAILABLE | UID#1 | 150 W |
| TAPID#2 | CID#1 | REFRIGERATOR | HIGH | UNAVAILABLE | UID#2 | 500 W |
| TAPID#2 | CID#2 | AIR CONDITIONER | MEDIUM | UNAVAILABLE | UID#1 | 2000 W |
| TAPID#2 | CID#3 | DESK LAMP | LOW | AVAILABLE | UID#1 | 60 W |
| ... | ... | ... | ... | ... | ... | ... |

FIG. 10

| TAP IDENTIFICATION INFORMATION | OUTLET IDENTIFICATION INFORMATION | DEVICE TYPE INFORMATION | PRIORITY INFORMATION | CONTROL AVAILABILITY INFORMATION | TERMINAL IDENTIFICATION INFORMATION | TOLERANCE INFORMATION |
|---|---|---|---|---|---|---|
| TAPID#1 | CID#1 | PERSONAL COMPUTER | MEDIUM | AVAILABLE | UID#1 | 0 W |
| TAPID#1 | CID#2 | ELECTRIC WATER BOILER | HIGH | AVAILABLE | UID#1 | 15 W |
| TAPID#1 | CID#3 | TELEVISION | LOW | AVAILABLE | UID#1 | 0 W |
| TAPID#2 | CID#1 | REFRIGERATOR | HIGH | UNAVAILABLE | UID#2 | 15 W |
| TAPID#2 | CID#2 | AIR CONDITIONER | MEDIUM | UNAVAILABLE | UID#1 | 10 W |
| TAPID#2 | CID#3 | DESK LAMP | LOW | AVAILABLE | UID#1 | 5 W |
| ... | ... | ... | ... | ... | ... | ... |

METHOD OF CONTROLLING POWER IN A WIRELESS COMMUNICATION SYSTEM

CROSS-REFERENCE TO RELATED APPLICATION

This application is based upon and claims the benefit of priority of the prior Japanese Patent Application No. 2013-139634, filed on Jul. 3, 2013, the entire contents of which are incorporated herein by reference.

FIELD

The embodiments discussed herein are related to a wireless communication system, a computer-readable storage medium, and a wireless communication control method.

BACKGROUND

A wireless communication system including a wireless base station apparatus and a terminal device capable of communicating with the wireless base station apparatus has been discussed (refer to, for example, 3GPP TS 36.300 and IEEE 802.11b).

A power control system which includes a power source apparatus including an outlet unit capable of supplying power to an external device and controls supply of power to the external device connected to the outlet unit (refer to, for example, Japanese Laid-open Patent Publication No. 2005-277528, Japanese Laid-open Patent Publication No. 2009-112155, and Japanese Laid-open Patent Publication No. 2009-117129).

A first power control system which is one of this type of power control systems includes a multi-function remote controller, and a station which communicates with the multi-function remote controller in a wireless manner. In the first power control system, the multi-function remote controller transmits a control signal to a power source apparatus through the station in response to an instruction which is input by a user to the multi-function remote controller. Thus, the power source apparatus controls the supply of power to the external device in accordance to the control signal.

Further, a second power control system which is one of this type of power control systems includes a remote control terminal. In the second power control system, the remote control terminal transmits a control signal to a power source apparatus in response to an instruction which is input by a user to the remote control terminal. Thus, the power source apparatus controls the supply of power to the external device in accordance with the control signal.

Furthermore, a third power control system which is one of this type of power control systems includes a human sensor. The human sensor detects the state of a room. The third power control system controls the supply of power to the external device by the power source apparatus, based on the detection result by the human sensor.

In the wireless communication system described above, when the terminal device capable of communicating with the wireless base station apparatus includes an outlet unit capable of supplying power to an external device, it is considered that it is preferable to control the supply of power to the external device connected to the outlet unit. In this case, as an example, it is considered to configure the wireless communication system so as to perform the same control as that of the power control system described above.

However, for example, in the first power control system or the second power control system, when there is no instruction from the user, it is not possible to control the supply of power to the external device. Further, in the first power control system to third power control system, for example, it is not possible to control the supply of power to the external device in accordance with the amount of power.

Therefore, there is a problem that it is difficult to reduce the amount of power consumed by the external device while the user uses the external device without any hindrance.

SUMMARY

According to an aspect of the embodiments, a wireless communication system includes a wireless base station apparatus and a terminal device capable of communicating with the wireless base station apparatus, wherein the wireless base station apparatus includes a measurement information reception unit configured to receive measurement information indicating a measurement value acquired in the terminal device, a determination unit configured to make a determination as to whether an amount of power in the terminal device is to be reduced, and a control information transmission unit configured to transmit control information indicating power control to the terminal device, based on a determination result of the determination unit, and wherein the terminal device includes at least one outlet unit configured to be able to supply power to an external device, a measurement unit configured to acquire the measurement value by measuring power in the terminal device, a measurement information transmission unit configured to transmit the measurement information indicating the measurement value acquired by the measurement unit to the wireless base station apparatus, a control information reception unit configured to receive the control information from the wireless base station apparatus, and a power supply control unit configured to control supply of power from the outlet unit, based on the received control information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an example of a table illustrating individual information stored by the base station as an example of the first embodiment;

FIG. 8 is a flowchart illustrating a first control process performed by a base station as an example of the first embodiment;

FIG. 9 is an example of a table illustrating individual information stored by a base station as a modification of the first embodiment;

FIG. 10 is an example of a table illustrating individual information stored by a base station as another modification of the first embodiment;

DESCRIPTION OF EMBODIMENTS

Hereinafter, in order to solve at least one of the problems described above, each embodiment of a wireless communication system, a computer-readable storage medium, and a wireless communication control method according to the embodiments will be described with reference to FIG. 1 to FIG. 20.

First Embodiment (Overview)

A wireless communication system according to a first embodiment includes a wireless base station apparatus, and a terminal device capable of communicating with the wireless base station apparatus.

The wireless base station apparatus receives measurement information indicating a measurement value acquired from the terminal device. Further, the wireless base station apparatus makes a determination as to whether or not an amount of power in the terminal device is to be reduced. In addition, the wireless base station apparatus transmits control information indicating power control to the terminal device, based on a result of the determination.

Further, the terminal device includes an outlet unit capable of supplying power to an external device. Further, the terminal device acquires a measurement value by measuring power in the terminal device. In addition, the terminal device transmits measurement information indicating the acquired measurement value to the wireless base station apparatus. The terminal device receives control information from the wireless base station apparatus and controls the supply of power from the outlet unit based on the received control information.

However, the wireless base station apparatus easily acquires information indicating usage status, usage environment, or the like of the external device. Therefore, the wireless base station apparatus is able to appropriately determine whether or not the amount of power in the terminal device is to be reduced. As a result, according to the wireless communication system configured as described above, it is possible to reduce the amount of power consumed by the external device while the user uses the external device without any problem.

Hereinafter, the first embodiment will be described in detail.

(Configuration)

Figure 1:
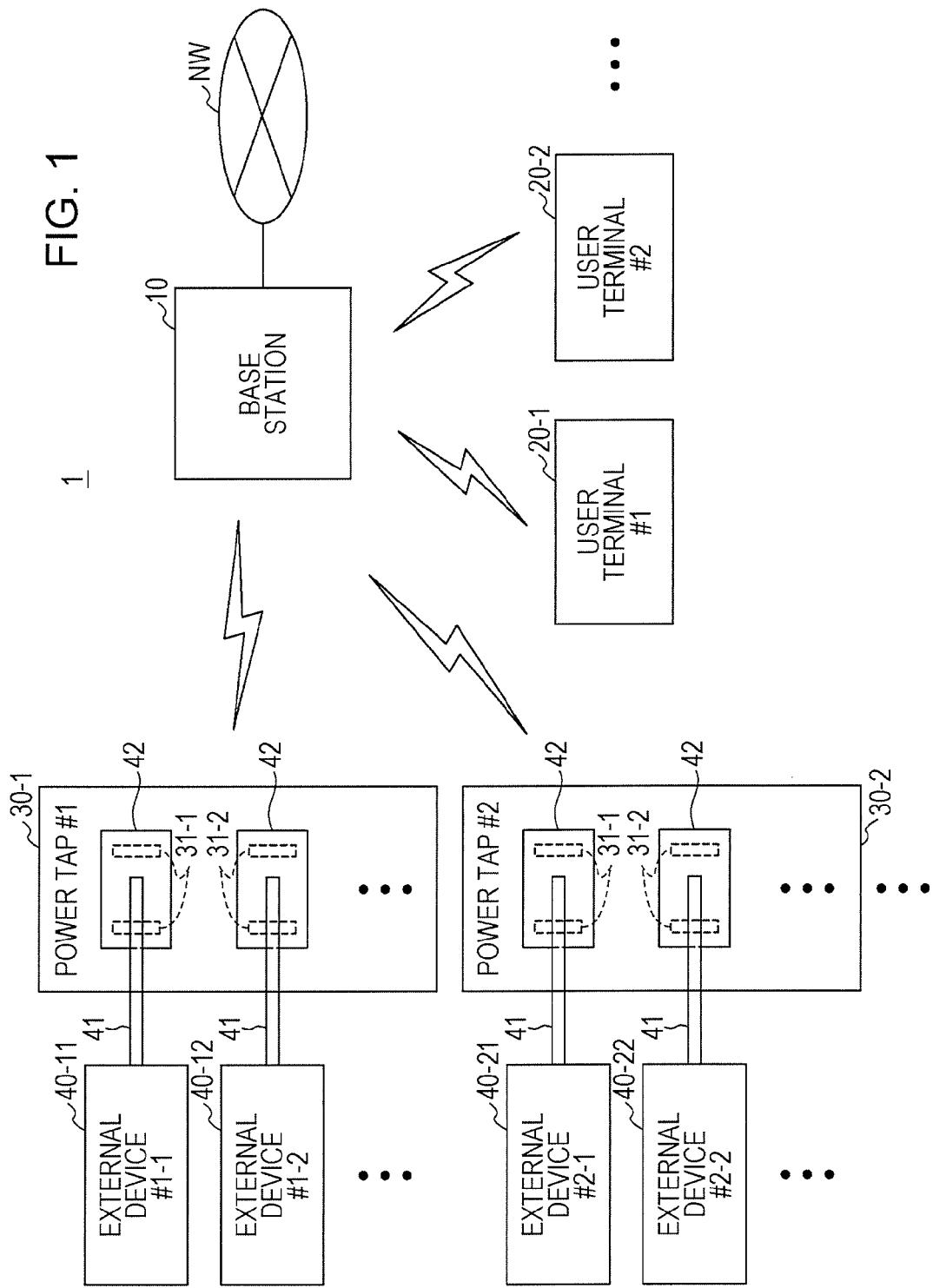
FIG. 1 is a diagram illustrating a configuration of a wireless communication system as an example of a first embodiment.

As illustrated in FIG. 1, a wireless communication system 1 according to the first embodiment includes a base station 10, a plurality of user terminals 20-1, 20-2, ... and a plurality of power taps 30-1, 30-2, ....

Further, in the following description, the user terminal 20-$i$ (where i is a natural number) may be represented as a user terminal #i. Further, without distinction, a plurality of user terminals 20-$i$ may simply be represented as a user terminal 20. Similarly, the power tap 30-$j$ (where j is a natural number) may be represented as a power tap #j. Further, without distinction, a plurality of power taps 30-$j$ may simply be represented as a power tap 30.

In addition, the wireless communication system 1 may include only one user terminal 20. Further, the wireless communication system 1 may include only one power tap 30.

In addition, the base station 10 is an example of the wireless base station apparatus. Further, the power tap 30 is an example of the terminal device. Further, the user terminal 20 is an example of the wireless communication apparatus.

In addition, the wireless base station apparatus may be a wireless access point, a parent device, or a station. Further, the terminal device may be an apparatus disposed on a surface forming the interior of a building (for example, a wall surface, a floor surface, a ceiling surface, or the like), or a furniture (for example, a chair, a desk, a table, a shelf, or the like).

The base station 10 is connected to a communication network (host network) NW. In the present example, the base station 10 communicates with other apparatuses (for example, another base station, a base station control device which controls a base station, a switching station, or the like) connected to the communication network NW, through the communication network NW. In addition, the base station control device and the switching station are respectively an example of a host apparatus.

In the present example, the base station 10 and the user terminal 20 constitute a mobile communication system. Specifically, the base station 10 and the user terminal 20 are configured to perform communication according to Long Term Evolution (LTE). In addition, the base station 10 and the user terminal 20 may be configured to perform communication according to a wireless communication method other than LTE (for example, LTE-Advanced, WiMAX, 3rd Generation (3G), 2nd Generation (2G), or the like). WiMAX is an abbreviation of Worldwide Interoperability for Microwave Access.

In the present example, the base station 10 is a femto base station. In addition, the base station 10 may be a macro base station or a home base station.

Further, the base station 10 and the user terminal 20 may be configured to select a certain wireless communication method and to perform communication according to the selected wireless communication method, as well as being configured to be capable of communicating according to a plurality of wireless communication methods.

The base station 10 is configured to be capable of performing wireless communication with the user terminal 20 located within an area (communication area) in which communication with the station 10 is possible (for example, the reception intensity of a wireless signal is a predetermined threshold intensity or greater). In addition, the communication area is an example of a wireless communication service zone provided by the base station 10.

Similarly, the base station 10 is configured to be capable of performing wireless communication with the power tap 30 located within the communication area. In addition, the base station 10 may be configured to be capable of performing wired communication with the power tap 30.

The power tap 30 includes a plurality of outlet units 31-1, 31-2, .... The outlet unit 31-$k$ (where k is a natural number) may be represented as an outlet unit #k. Further, without distinction, a plurality of outlet units 31-$k$ may simply be represented as an outlet unit 31. The outlet unit 31 has a plug receptacle (insertion port) to which a power plug, which will be described later, may be inserted.

The power tap 30 is connected to a power source (for example, a battery, a commercial power source, a power system, a power grid, or a generator) through a power cable, not illustrated.

An external device 40-$mn$ (where m and n are natural numbers) is connected one by one to each of a plurality of outlet unit 31-$k$. The outlet unit 31 is connected to be capable of supplying power to the external device 40-$mn$.

The external device 40-$mn$ is a device that operates by the supply of electric power. For example, the external device 40-$mn$ is electrical equipment such as a personal computer, an electric kettle, a television, a refrigerator, an air conditioner, a desk lamp, an electric stove, a dryer, a microwave, a washing machine or a rice cooker.

The external device 40-$mn$ may be represented as an external device #m-n. Further, without distinction, a plurality of external devices 40-$mn$ may simply be represented as an external device 40. In the present example, the external device #m-n is connected to an outlet unit 31-$n$ having a power tap 30-$m$.

The power tap 30 is configured to be capable of supplying power to the external device 40 connected to the outlet unit 31.

The external device 40 includes a power cable 41, and a power plug 42 connected to the end of the power cable 41. Power is supplied to the external device 40 from the power tap 30 through the power cable 41, by the power plug 42 being inserted to the outlet unit 31.

Figure 2:
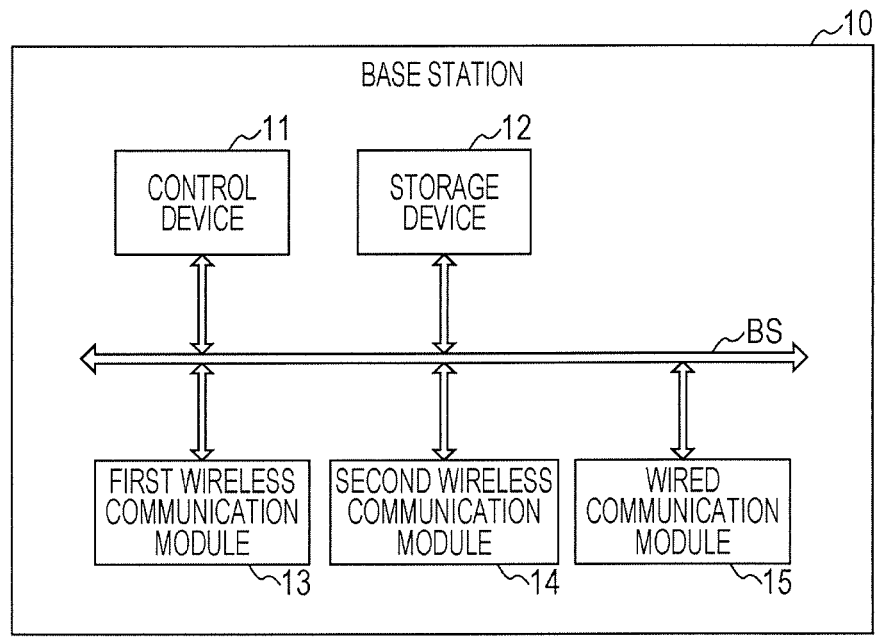
FIG. 2 is a diagram illustrating a configuration of a base station as an example of the first embodiment.

As illustrated in FIG. 2, the base station 10 includes a control device 11, a storage device 12, a first wireless communication module 13, a second wireless communication module 14, and a wired communication module 15, which are connected to each other through a bus BS.

In order to implement functions described below, the control device 11 controls respective apparatuses included in the base station 10. In the present example, the control device 11 is made from a Large Scale Integration (LSI). In addition, the control device 11 may be made from a programmable logic device (PLD). Further, the control device 11 includes a processing apparatus such as a central processing unit (CPU), and the processing apparatus may implement functions described below by executing a program stored in the storage device 12.

The storage device 12 stores information in a readable and writable manner. For example, the storage device 12 includes at least one of a RAM, a ROM, a HDD, a SDD, a semiconductor memory, and an organic memory. The RAM is an abbreviation of a random access memory. The ROM is an abbreviation of a read only memory. The HDD is an abbreviation of a hard disk drive. The SSD is an abbreviation of a solid state drive. In addition, the storage device 12 may include a recording medium of a disk such as a flexible disk, an optical disk, a magneto-optical disk, and a semiconductor memory, and a reading apparatus capable of reading information from the recording medium.

The first wireless communication module 13 includes an antenna. The first wireless communication module 13 communicates in a wireless manner with the user terminal 20 or the power tap 30 which is located in an area (first communication area) in which communication with the station 10 is possible through the antenna. The first communication area is called a first wireless communication service zone. The first wireless communication module 13 performs communication according to a first wireless communication method. In the present example, the first wireless communication method is a method defined in an IEEE 802.11 series or an IEEE 802.15 series. IEEE is an abbreviation of an Institute of Electrical and Electronics Engineers.

The second wireless communication module 14 includes an antenna. The second wireless communication module 14 communicates in a wireless manner with the user terminal 20 which is located in an area (second communication area) in which communication with the station 10 is possible through the antenna. The second communication area is called a second wireless communication service zone. The second wireless communication module 14 performs communication according to a second wireless communication method which is different from the first wireless communication method. In the present example, the second wireless communication method is a method according to LTE. In addition, the second wireless communication method may be a method according to LTE-Advanced, WiMAX, 3G, or 2G. For example, the second wireless communication method may be a method which performs wireless communication by using a frequency bandwidth different from that of the first wireless communication method.

Further, the first wireless communication module 13 and the second wireless communication module 14 may be configured to share one antenna.

The wired communication module 15 includes a communication port which is connectable to a communication cable. The wired communication module 15 communicates with other apparatuses (for example, other base station, a base station control device for controlling the base stations, an exchanging station, or the like) which are connected to a communication network NW, over the communication network NW connected through the communication cable. In addition, the wired communication module 15 is an example of an interface unit.

In addition, the base station 10 may be connected to the communication network NW in a wireless manner.

Figure 3:
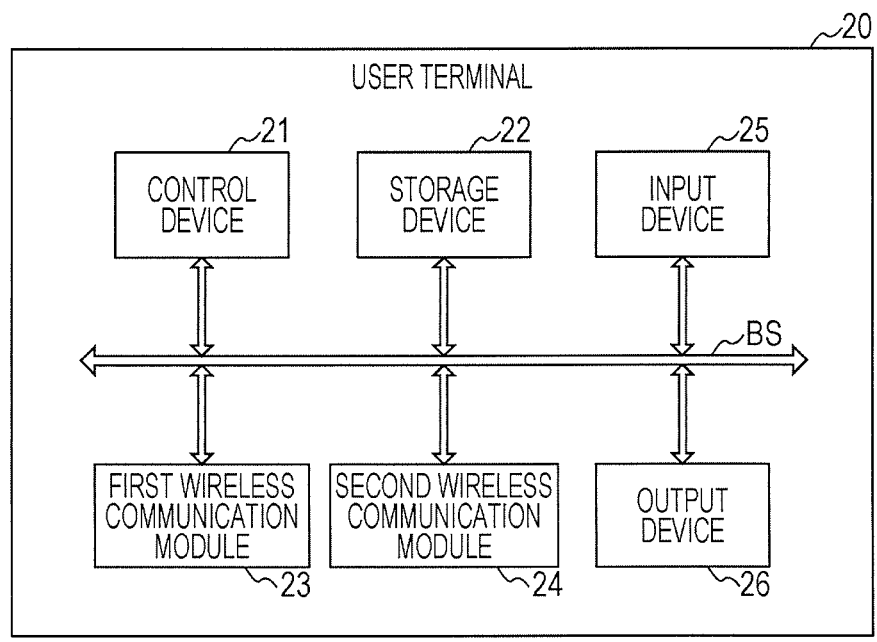
FIG. 3 is a diagram illustrating a configuration of a user terminal as an example of the first embodiment.

As illustrated in FIG. 3, the user terminal 20 includes a control device 21, a storage device 22, a first wireless communication module 23, a second wireless communication module 24, an input device 25, and an output device 26, which are connected to each other through a bus BS. In the present example, the user terminal 20 does not include an outlet unit.

In order to implement functions described below, the control device 21 controls respective apparatuses included in the user terminal 20, similarly to the control device 11. The storage device 22 is configured similarly to the storage device 12. The first wireless communication module 23 is configured similarly to the first wireless communication module 13. The first wireless communication module 23 communicates with the base station 10 according to the first wireless communication method. The second wireless communication module 24 is configured similarly to the second wireless communication module 14. The second wireless communication module 24 communicates with the base station 10 according to the second wireless communication method.

In the present example, the communication area according to the first wireless communication method (first communication area) and the communication area according to the second wireless communication method (second communication area) are different. Thus, in the present example, the wireless communication system 1 is configured in such a manner that the base station 10 and the user terminal 20 communicate according to the first wireless communication method when the user terminal 20 is located within both the first communication area and the second communication area. In addition, the first communication area and the second communication area may match.

The input device 25 receives information which is input by a user. The output device 26 outputs information. In the present example, the input device 25 and the output device 26 are configured with a touch panel type display. In addition, the output device 26 may be configured with a display other than the touch panel type display and the input device 25 may be configured with a key-type button, or the like.

Further, at least one of the base station 10 and the user terminal 20 may be configured to be able to communicate according to three or more wireless communication methods. Further, at least one of the base station 10 and the user terminal 20 may be configured to be able to communicate according to only one wireless communication method.

Figure 4:
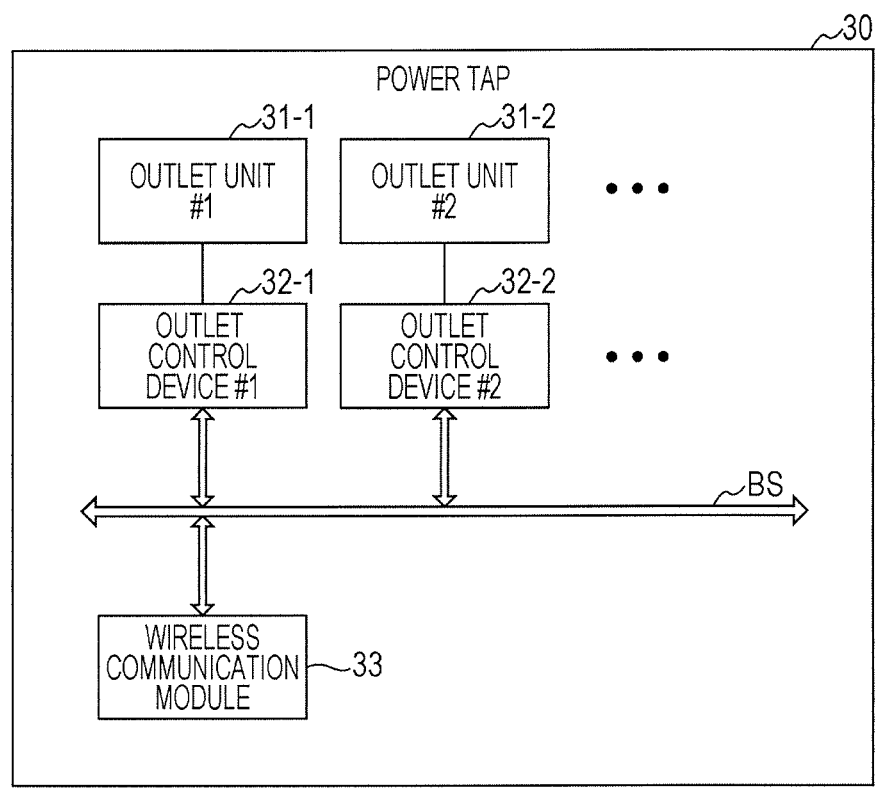
FIG. 4 is a diagram illustrating a configuration of a power tap as an example of the first embodiment.

As illustrated in FIG. 4, the power tap 30 includes a plurality of outlet control devices 32-1, 32-2, . . . , and a wireless communication module 33 which are connected to each other through a bus BS. The outlet control device 32-$p$ (where p is a natural number) may be represented as an outlet control device #p. Further, without distinction, the plurality of outlet control devices 32-$p$ may simply be represented as an outlet control device 32.

The power tap 30 includes outlet control devices 32-$p$ of the same number as the number of the outlet units 31 included in the tap 30. The outlet control device #p controls the outlet unit #p.

Specifically, the outlet control device 32 switches a state of the outlet unit 31 between a supply state in which power is supplied to the external device 40 connected to the outlet unit 31 and a suppression state in which the power supplied to the external device 40 is suppressed. In the present example, the suppression state is a cut-off state in which the power supplied to the external device 40 is cut-off.

Further, the outlet control device 32 measures the amount of power supplied to the external device 40 connected to the outlet unit 31 (the amount of power supply). In the present example, the outlet control device 32 measures the amount of power supply in a period having the same length as a measurement period, each time a predetermined measurement period elapses.

The wireless communication module 33 is configured similarly to the first wireless communication module 13. The wireless communication module 33 communicates with the base station 10 according to the first wireless communication method.

(Functions)

Figure 5:
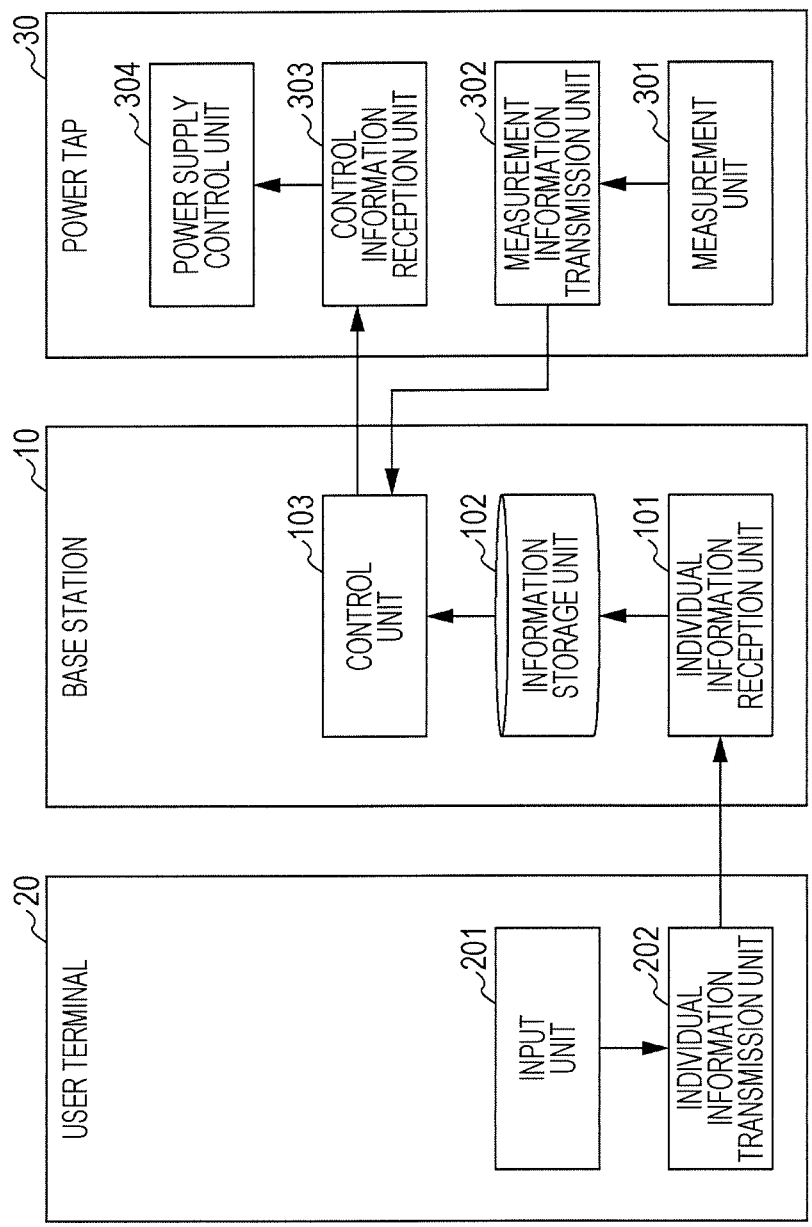
FIG. 5 is a diagram illustrating a function of the wireless communication system as an example of the first embodiment.

Next, the functions of the wireless communication system 1 will be described with reference to FIG. 5.

The function of the user terminal 20 includes an input unit 201, and an individual information transmission unit 202.

The input unit 201 receives individual information which is input by the user through the input device 25.

The individual information transmission unit 202 transmits the individual information which is received by the input unit 201 to the base station 10.

In the present example, the individual information, as illustrated in FIG. 6, is information associated with tap identification information, outlet identification information, device type information, priority information, control availability information, and terminal identification information.

The tap identification information is information for identifying the power tap 30 in the wireless communication system 1. In the present example, the tap identification information for identifying a power tap 30-$j$ is denoted by "TAPID#j".

The outlet identification information is information for identifying the outlet unit 31 in the power tap 30. In the present example, the outlet identification information for identifying the outlet unit 31-$k$ is denoted by "CID#k".

The device type information is information indicating the type of the external device 40. For example, the device type information is denoted by a "personal computer", an "electric water boiler", a "television", or the like.

Priority information is information indicating a priority which is a degree to which the supply of power to the external device 40 is prioritized. In the present example, the priority information is denoted by "high", "medium", or "low". The priority information denoted by "high" represents that its priority is higher than that of the priority information denoted by "medium". Further, the priority information denoted by "medium" represents that its priority is higher than that of the priority information denoted by "low".

In addition, the priority information may represent priorities having two different values or three or more different values. For example, the priority may be denoted by an integer.

The control availability information is information indicating whether or not the supply of power to the external device 40 may be controlled. In the present example, the control availability information is denoted by "available" or "unavailable". The control availability information denoted by "available" indicates that the supply of power to the external device 40 is controllable. In contrast, the control availability information denoted by "unavailable" indicates that the supply of power to the external device 40 is not controllable.

The terminal identification information is information for indicating a user terminal 20-$i$, which is a transmission source of the individual information, in the wireless communication system 1. In the present example, the terminal identification information for identifying a user terminal 20-$i$ is denoted by "UID#i". In addition, the terminal identification information may not be included in the terminal individual information.

For example, the individual information may be information associated with each of the plurality of external devices 40 connected to the plurality of outlet units 31.

The function of the power tap 30 includes a measurement unit 301, a measurement information transmission unit 302, a control information reception unit 303, and a power supply control unit 304.

The measurement unit 301 acquires a measurement value representing measured power, by measuring power in the tap 30. In the present example, the measurement unit 301 acquires a measurement value by measuring the amount (the amount of power supply) of power supplied to the external device 40 connected to the outlet unit 31, from the outlet units 31, with respect to each of the plurality of outlet units 31 included in the tap 30. In the present example, the measurement unit 301 measures the amount of power supply in a period having the same length as a measurement period, each time a predetermined measurement period elapses. In addition, the measurement unit 301 may acquire a measurement value representing received power which is measured, by measuring the received power of wireless signals which are transmitted by the base station 10.

The measurement information transmission unit 302 transmits measurement information indicating a measurement value measured by the measurement unit 301 (in the present example, a value indicating the amount of power supply) to the base station 10. In the present example, the measurement information is also referred to as information on the amount of power supply.

The control information reception unit 303, as will be described later, receives control information transmitted by the base station 10. The control information, as will be described later, is information used for controlling the supply of power from the outlet units 31 selected by the base station 10 (that is, the supply of power to the external device 40 connected to the selected outlet units 31).

The power supply control unit 304 controls the supply of power to the external device 40 connected to the outlet unit 31, from the outlet units 31, based on the control information received by the control information reception unit 303.

Figure 7:
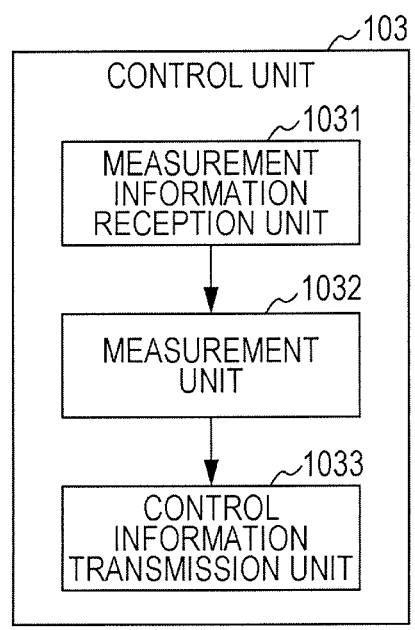
FIG. 7 is a diagram illustrating a function of a control unit as an example of the first embodiment.

The function of the base station 10 includes an individual information reception unit 101, an information storage unit 102, and a control unit 103. As illustrated in FIG. 7, the control unit 103 includes a measurement information reception unit 1031, a determination unit 1032, and a control information transmission unit 1033. In addition, the information storage unit 102 is an example of the storage unit.

The individual information reception unit 101 receives individual information transmitted by the user terminal 20.

The information storage unit 102 stores individual information received by the individual information reception unit 101.

The measurement information reception unit 1031 receives measurement information transmitted by the power tap 30.

The determination unit 1032 makes a determination as to whether the amount of power in the power tap 30 is to be reduced. In the present example, the determination unit 1032 calculates (acquires) the sum of the amount of power supply to the plurality of outlet units 31 included in the power tap 30, based on the received measurement information and acquires total information indicating the calculated sum. In addition, the total information is an example of the entirety of information. The entirety of information is information regarding all of the plurality of external devices 40 connected to the plurality of outlet units 31.

When the sum of the amount of power supply indicated by the total information is equal to or higher than a predetermined supply amount threshold, the determination unit 1032 determines (decides) that the amount of power in the power tap 30 is to be reduced (that is, controls the amount of power supplied to the plurality of external devices 40). In contrast, when the sum is less than the supply amount threshold, the determination unit 1032 determines that the amount of power in the power tap 30 is not to be reduced (that is, does not control the amount of power supplied to the plurality of external devices 40).

In addition, the determination unit 1032 may be configured to determine whether or not the amount of power in the power tap 30 is to be reduced, based on the charge (electricity charge) imposed on the amount of power supplied to the external device 40. In this case, it is preferable that the determination unit 1032 store in advance information defining a relationship between the amount of power supplied to the external device 40 and the electricity charge, and calculate an electric charge based on the sum of the amount of power supply and the stored information.

Further, when a power source is a storage battery, the determination unit 1032 may be configured to determine a supply amount threshold based on the amount of power accumulated in the storage battery. When a power source is a power generator, the determination unit 1032 may be configured to determine a supply amount threshold based on the amount of power generated by the power generator.

When it is determined that the amount of power in the power tap 30 is to be reduced by the determination unit 1032, the control information transmission unit 1033 selects at least one outlet unit 31 among the plurality of outlet units 31, based on the individual information stored in the information storage unit 102.

In the present example, the control information transmission unit 1033 extracts outlet units 31 specified by a set of the tap identification information and the outlet identification information which are associated with the control availability information indicating that the supply of power may be controlled. For example, the extracted outlet unit 31 may be the outlet units 31 connected to the external device 40 to which supply of power may be controlled as indicated by the control availability information.

Further, the control information transmission unit 1033 preferentially selects the outlet units 31 specified by the sets of the tap identification information and the outlet identification information which are associated with the priority information indicating lower priority among the extracted outlet units 31. For example, the control information transmission unit 1033 may preferentially select outlet units 31 connected to the external devices 40 having a low priority as indicated by the priority information.

In the present example, the control information transmission unit 1033 selects the outlet units 31 of a predetermined selection number in an ascending order of priority. In addition, the control information transmission unit 1033 may select all outlet units 31 connected to the external devices 40 having priorities lower than a predetermined priority threshold as indicated by the priority information.

Thus, it may be said that the control information transmission unit 1033 does not select the outlet units 31 which are connected to the external devices 40 to which supply of power is not controllable (for example, out of control) as indicated by the control availability information.

When it is determined that the amount of power in the power tap 30 is to be reduced, the control information transmission unit 1033 generates control information used to control the supply of power to the external devices 40 connected to the outlet units 31 from the selected outlet units 31. In the present example, the control information transmission units 1033 are respectively associated with the power taps 30 having the selected outlet units 31 and generate control information for the outlet units 31 included in the power taps 30.

In the present example, the control information is power suppression control information. The power suppression control information includes outlet identification information for identifying the selected outlet unit 31 and a switching instruction to instruct a switching of the state of the outlet unit 31 to the suppression state.

The control information transmission unit 1033 transmits the each piece of the generated control information to the power tap 30 associated with the control information.

(Operation)

Next, the operation of the wireless communication system 1 described above will be described with reference to FIG. 8.

First, each user terminal 20 receives individual information which is input by the user. Then, each user terminal 20 transmits the received individual information to the base station 10. The base station 10 receives the individual information from each user terminal 20, and stores the received individual information in the storage device 12.

Further, each power tap 30 transmits measurement information to the base station 10, each time a predetermined measurement period elapses.

The base station 10 performs a first control process illustrated in the flowchart of FIG. 8, each time a predetermined execution period elapses.

First, the base station 10 is on standby until measurement information is received from each power tap 30 (step S101 in FIG. 8). If the measurement information is received from each power tap 30, the base station 10 makes a determination of "Yes" and proceeds to step S102.

Then, the base station 10 calculates the sum of the amount of power supply indicated by the received measurement information to acquire total information (entirety of information) indicating the calculated sum. For example, in the present example, the sum of the amount of power supply may be the sum for the outlet units 31 included in all power taps 30 included in the wireless communication system 1.

Next, the base station 10 determines whether the sum of the amount of power supply indicated by the entirety of information is a predetermined supply amount threshold or more (step S103 in FIG. 8). When the sum of the amount of power supply is the supply amount threshold or more, the base station 10 makes a determination of "Yes" and proceeds to step S104. In addition, the determination of "Yes" in step S103 is an example of the determination that the amount of power in the power tap 30 is to be reduced.

Then, the base station 10 extracts the outlet units 31 of the external devices 40 that may be controlled. For example, the base station 10 may extract the outlet unit 31 specified by a set of tap identification information and outlet identification information associated with the control availability information indicating that the supply of power may be controlled.

For example, a case is assumed where individual information illustrated in FIG. 6 is stored. In this case, the base station 10 extracts the outlet unit 31 specified by respective sets of "TAPID#1" and "CID#1", "TAPID#1" and "CID#2", "TAPID#1" and "CID#3", and "TAPID#2" and "CID#3".

Next, the base station 10 preferentially selects the outlet units 31 connected to the external devices 40 having a low priority as indicated by the priority information, by a selection number, among extracted outlet units 31 (step S105 in FIG. 8). For example, the base station 10 may preferentially select the outlet units 31 specified by a set of the tap identification information and the outlet identification information, which are associated with the priority information indicating lower priority by a selection number, among extracted outlet units 31.

For example, a case is assumed where the individual information illustrated in FIG. 6 is stored and the selection number is 3. In this case, the base station 10 selects the outlet units 31 specified by respective sets of "TAPID#1" and "CID#3", "TAPID#2" and "CID#3", and "TAPID#1" and "CID#1".

Then, the base station 10 generates power suppression control information for the selected outlet unit 31 (step S106 in FIG. 8). In the present example, the base station 10 generates power suppression control information for the outlet units 31 included in the power taps 30, in association with respective power taps 30 included in the selected outlet unit 31.

Next, the base station 10 transmits each piece of the generated control information (power suppression control information) to the power tap 30 associated with the control information (step S107 in FIG. 8). Then, the base station 10 completes the first control process of FIG. 8.

In addition, when the sum of the amount of power supply is smaller than the supply amount threshold, the base station 10 makes a determination of "No" in step S103 in FIG. 8, and completes the first control process in FIG. 8. In addition, the determination of "No" in step S103 is an example of the determination that the amount of power in the power tap 30 is not to be reduced.

In contrast, when control information (power suppression control information) transmitted by the base station 10 is received, each power tap 30 controls the supply of power to the external device 40 connected to the outlet unit 31 included in the tap 30, based on the received control information. In the present example, each power tap 30 switches each state of the outlet unit 31 identified by the outlet identification information included in the received control information to a suppression state (in the present example, a cut-off state).

Thus, in the wireless communication system 1, when the sum of the amount of power supply is the supply amount threshold or more, the state of at least one outlet unit 31 is switched to the suppression state. Thus, the total amount of power supplied in the wireless communication system 1 is reduced.

As described above, in the wireless communication system 1 according to the first embodiment, the base station 10 receives measurement information indicating the acquired measurement value in the power tap 30. Further, the base station 10 determines as to whether or not the amount of power in the power tap 30 is to be reduced. In addition, the base station 10 transmits the control information indicating power control for the power tap 30, based on the determined result. Meanwhile, the power tap 30 includes the outlet unit 31 capable of supplying power to the external device 40. Further, the power tap 30 acquires a measurement value by measuring power in the power tap 30. In addition, the power tap 30 transmits measurement information indicating the acquired measurement value to the base station 10. Further, the power tap 30 receives control information from the base station 10. The power tap 30 controls the supply of power from the outlet units 31, based on the received control information.

However, the base station 10 easily acquires information indicating the usage status, the usage environment or the like of the external device 40. Therefore, the base station 10 is able to appropriately determine as to whether or not the amount of power in the power tap 30 is to be reduced. As a result, it is possible to reduce the amount of power consumed by the external device 40 while the user uses the external device 40 without any hindrance.

Further, in the wireless communication system 1 according to the first embodiment, the power tap 30 includes a plurality of outlet units 31. Further, when it is determined that the amount of power in the power tap 30 is to be reduced, the base station 10 transmits control information based on individual information. In other words, the base station 10 selects at least one outlet unit 31 among the plurality of outlet units 31, based on the individual information associated with each of the plurality of outlet units 31 included in the power tap 30. Further, the base station 10 transmits control information used to control the supply of power from the selected outlet unit 31.

According to this, for example, it is possible to control the supply of power to each external device 40 depending on both the change in the status of all of the plurality of external devices 40 and the feature of each external device 40. As a result, it is possible to reduce the amount of power consumed by the external device 40 while the user uses the external device 40 without any hindrance.

Further, in the wireless communication system 1 according to the first embodiment, the power tap 30 acquires a measurement value by measuring the amount of power supply which is the amount of power supplied to the external device 40 from the outlet units 31 for each of the plurality of outlet units 31. Furthermore, the base station 10 acquires the sum of the amount of power supply for the plurality of outlet units 31 included in the power tap 30, from the measurement information received from the power tap 30, and makes a determination based on the sum.

The amount of power supply represents well the usage status of the external device 40. According to the configuration, it is possible to appropriately control the supply of power to the external device 40 depending on the usage status of the external devices 40.

Further, in the wireless communication system 1 according to the first embodiment, when the sum of the amount of power supply is a predetermined threshold or more, the base station 10 determines that the amount of power in the power tap 30 is to be reduced. In contrast, when the sum is smaller than the threshold, the base station 10 determines that the amount of power in the power tap 30 is not to be reduced.

According to this, it is possible to avoid a state in which the sum of the amount of power supplied to the plurality of external devices 40 is the threshold or more from continuing.

Further, in the wireless communication system 1 according to the first embodiment, the individual information includes priority information indicating a priority which is a degree to which the supply of power to the external device 40 is prioritized. In addition, the base station 10 preferentially selects the outlet units 31 connected to the external devices 40 having a low priority as indicated by the priority information.

According to this, while appropriately reflecting the priority according to the feature of the external device 40, it is possible to reduce the sum of the amounts of power supplied to the plurality of external devices 40.

Further, in the wireless communication system 1 according to the first embodiment, the user terminal 20 transmits individual information which is input by the user to the base station 10. Further, the base station 10 receives the individual information from the user terminal 20 so as to store the received individual information.

According to this, while reflecting the desire of the user, it is possible to control the supply of power to the external device 40 depending on the change in the usage status or usage environment of all the plurality of external devices 40.

In addition, the base station 10 according to the first embodiment is configured to select the outlet unit 31 based on the priority information after extracting the outlet units 31 based on the control availability information. However, the base station 10 may be configured to select the outlet units 31 based on the control availability information after extracting the outlet units 31 based on the priority information.

Further, the wireless communication system 1 may not include the user terminal 20. In this case, individual information may be configured to be directly input to the base station 10.

The individual information may not include device type information. Further, the individual information may not include the terminal identification information.

In addition, the base station 10 may perform the first control process illustrated in FIG. 8 independently for each power tap 30. For example, the first control process illustrated in FIG. 8 may be performed independently for the respective plurality of power taps 30. Accordingly, when the sum of the amount of power supplied by the power tap 30 to be subjected to the first control process (tap to be processed) is the supply amount threshold or more, the base station 10 selects at least one outlet unit 31 among the outlet units 31 included in the tap to be processed 30. In this case, the base station 10 generates control information for the selected outlet unit 31, and transmits the generated control information to the tap to be processed 30.

Further, the wireless communication system 1 may be configured in such a manner that the user terminal 20 transmits control information which is input by the user to the power tap 30. Further, the user terminal 20 may be configured to transmit control information which is input by the user to the base station 10 and the base station 10 may be configured to transmit (transfer) the control information to the power tap 30.

Further, the wireless communication system 1 according to the first embodiment may be configured to identify (specify) the outlet unit 31 in the wireless communication system 1 by sets of the tap identification information and the outlet identification information. However, the wireless communication system 1 may identify the outlet unit 31 only by the outlet identification information, by using information uniquely assigned to each outlet unit 31 (for example, specific to the outlet unit 31) in the wireless communication system 1 as the outlet identification information. In this case, the individual information may not include the tap identification information.

In addition, the base station 10 may acquire reservation information indicating that a predetermined operation of the external device 40 is reserved, and the acquired reservation information may be used as individual information. For example, the base station 10 may acquire the reservation information by communicating directly with the external device 40. Further, the power tap 30 may be configured to acquire the reservation information by performing power line communication (PLC) with the external device 40, and to transmit the acquired reservation information to the base station 10.

The base station 10 stores the acquired reservation information in association with the tap identification information and the outlet identification information. For example, in this case, the individual information may include the reservation information.

For example, the reservation information includes information indicating a date and a time for starting the reserved operation.

The base station 10 is configured not to select the outlet unit 31 identified by the tap identification information and the outlet identification information which are associated with the reservation information indicating the date and time within the period until a predetermined preparation time elapses from a present time.

According to this, it is possible to avoid the supply of power to the external device 40 from being cut off immediately before a time point when the reserved operation is performed. As a result, the external device 40 is able to reliably perform the reserved operation.

Further, the base station 10 may generate power supply control information, for the outlet unit 31 identified by the tap identification information and the outlet identification information which are associated with the reservation information indicating the date and time within the period until a predetermined preparation time elapses from a present time. The power supply control information includes a switching instruction to instruct a switching of the state of the outlet unit 31 to the supply state.

According to this, it is possible to reliably supply power to the external device 40 immediately before a time point when the reserved operation is performed. As a result, the external device 40 is able to reliably perform the reserved operation.

Further, in the wireless communication system 1, the individual information, as illustrated in FIG. 9, may include information on the maximum amount of power. The information on the maximum amount of power is information indicating a maximum amount of power which is a maximum value of the amount of power to be supplied to the external device 40 (for example, consumed by the external device 40). In this case, the base station 10 is configured to preferentially select the outlet units 31 which is connected the external devices 40 of which the maximum amount of power is high as indicated by the information on the maximum amount of power.

According to this, when reducing the sum of the amounts of power supplied to the plurality of external devices 40, it is possible to reduce the number of external devices 40 to which supply of power is suppressed.

Further, the base station 10 may be configured to preferentially select the outlet units 31 of which the amount of power supply is high as indicated by the measurement information. For example, in this case, the individual information may include the measurement information (information on the amount of power supply). For example, the base station 10 may store information on the amount of power supply received from the power tap 30 in association with the tap identification information and the outlet identification information.

According to this, when reducing the sum of the amounts of power supplied to the plurality of external devices 40, it is possible to reduce the number of external devices 40 to which supply of power is suppressed.

In addition, the base station 10 may be configured to select the outlet unit 31 of which supply of power is to be controlled, based on any one or any combination of the control availability information, the priority information, the information on the maximum amount of power, and information on the amount of power supply.

Further, in the wireless communication system 1, the suppression state may be a reducing state in which the amount of power supplied to the external device 40 is reduced. In this case, it is preferable that the individual information include tolerance information, as illustrated in FIG. 10. The tolerance information is information indicating a maximum amount to which the amount of power to be supplied to the external device 40 may be reduced in a range in which the external device 40 is normally operable.

In this case, it is preferable that the control information include information on a reduction amount indicating an amount to which the amount of power to be supplied to the external device 40 is reduced, in addition to the outlet identification information and the switching instruction. For example, the base station 10 uses the tolerance information included in the individual information as the information on a reduction amount. Further, the base station 10 may use information indicating a value obtained by multiplying a predetermined coefficient and an amount indicated by the tolerance information, or by subtracting a predetermined allowance from the amount indicated by the tolerance information, as the information on a reduction amount.

Further, in the wireless communication system 1, the suppression state may be a repeated cut-off state in which a period (supply period) for supplying power to the external device 40 and a period (cut-off period) for cutting off the supply of power to the external device 40 are alternately and repeatedly provided.

Figure 11:
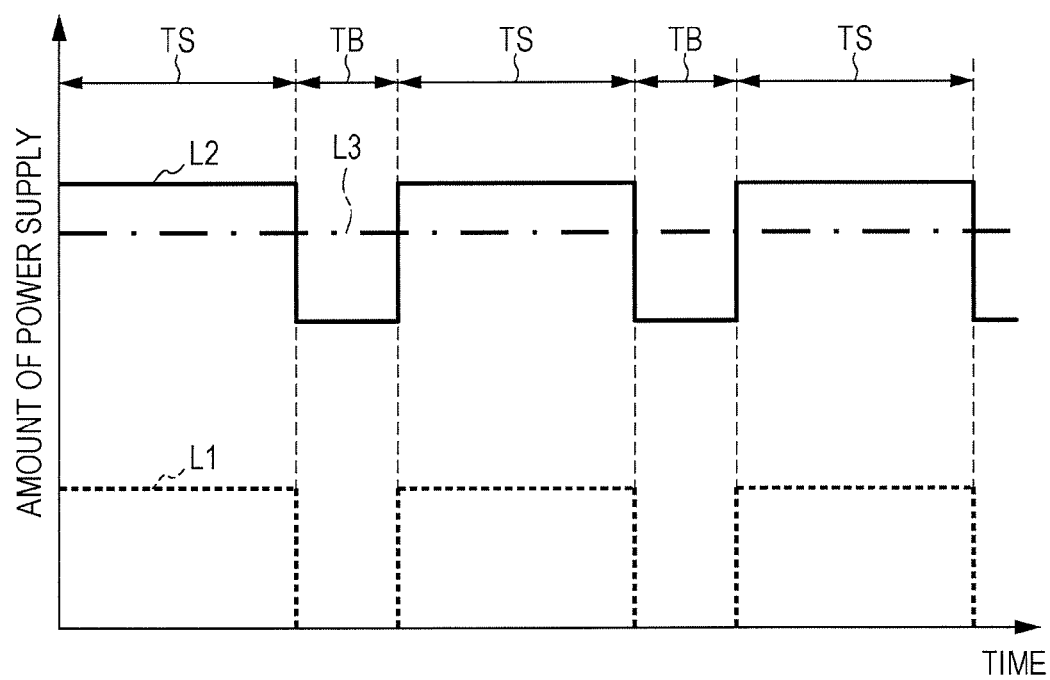
FIG. 11 is a graph illustrating a time change in an amount of power supplied when a state of an outlet is a repeated cut-off state by a power tap as a modification of the first embodiment.

In this case, the amount of power supplied by the outlet unit 31 of which supply of power is to be controlled varies in a manner that the supply period TS and the cut-off period TB are alternately and repeatedly provided, as illustrated by a dotted line L1 in FIG. 11. For example, the sum of the amount of power supply in the wireless communication system 1 may vary as illustrated by a solid line L2 in FIG. 11. Accordingly, a value obtained by averaging the sum of the amount of power supply in time in the wireless communication system 1 is reduced as illustrated by a dotted and dashed line L3 in FIG. 11.

First Modification of First Embodiment

Next, a wireless communication system according to a first modification of the first embodiment of the embodiments will be described. The wireless communication system according to the first modification of the first embodiment is different from the wireless communication system according to the first embodiment in that information indicating the sum of the amounts of power supplied to the external device associated with each user terminal is output. The following description will be made focusing on the difference. In addition, in the description of the first modification, those denoted by the same reference numeral as those used in the first embodiment are the same or substantially the same.

Figure 12:
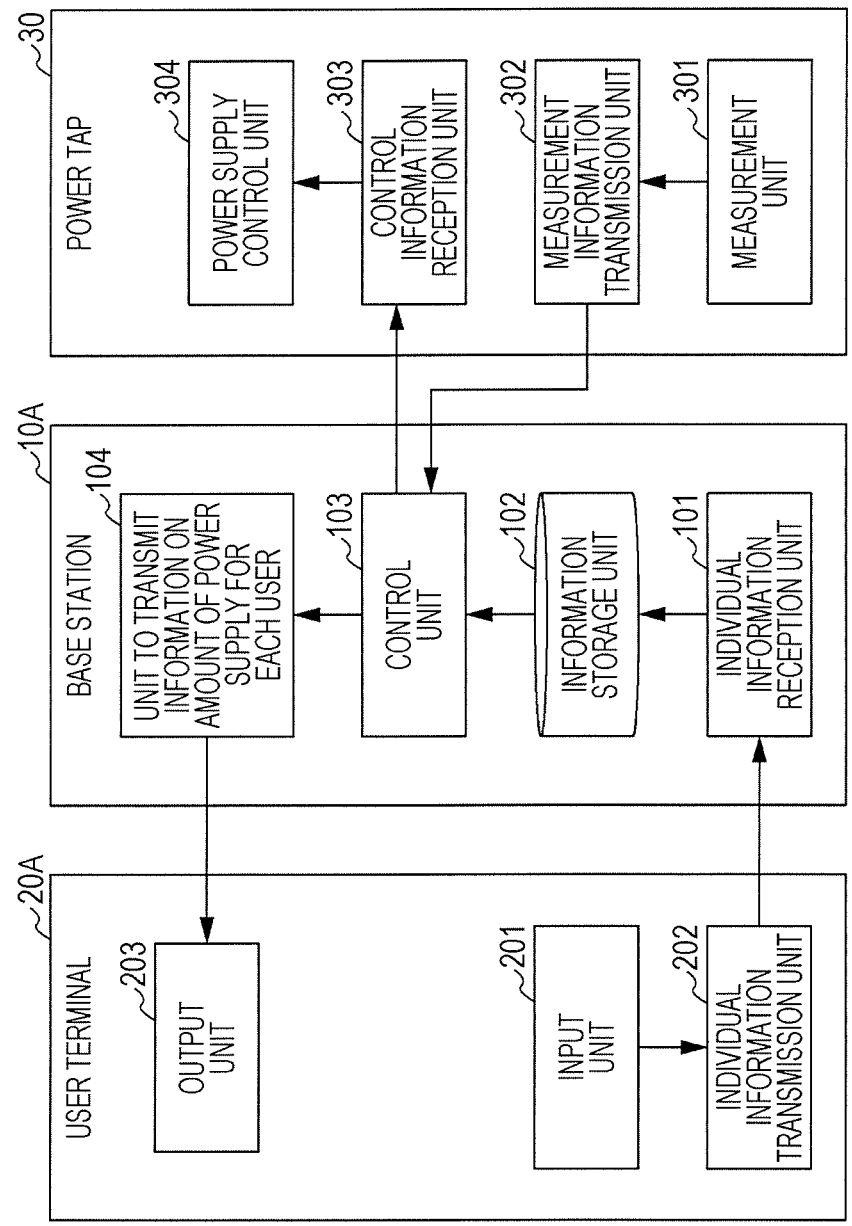
FIG. 12 is a diagram illustrating a function of a wireless communication system as an example of a first modification of the first embodiment.

As illustrated in FIG. 12, a wireless communication system 1A according to the first modification includes a base station 10A instead of the base station 10 according to the first embodiment, and a user terminal 20A instead of the user terminal 20. The function of the base station 10A further includes a unit 104 to transmit information on an amount of power supply for each user in addition to the function of the base station 10 according to the first embodiment. The function of the user terminal 20A includes a function of an output unit 203 in addition to the function of the user terminal 20 according to the first embodiment.

The unit 104 to transmit information on an amount of power supply for each user performs a transmission process for each of a plurality of user terminals 20A, based on the measurement information received by the measurement information reception unit 1031. The transmission process is a process of calculating the amount of power supply for each user, and for transmitting the calculated information on the amount of power supply for each user indicating the amount of power supply for each user, to the user terminal 20A to be subjected to the process.

The amount of power supply for each user is the sum of the amounts of power supplied to the external device 40 associated with the individual information transmitted by the user terminal 20A to be subjected to the transmission process. For example, the amount of power supply for each user may be the sum of the amounts of power supplied to the external device 40 connected to the outlet unit 31 specified by a set of the tap identification information and the outlet identification information which are associated with the terminal identification information for identifying the user terminal 20A to be subjected to the transmission process.

The output unit 203 receives information on the amount of power supply for each user transmitted by the base station 10. The output unit 203 outputs the received information on the amount of power supply for each user through the output device 26. In the present example, the output unit 203 displays the information on the amount of power supply for each user on the display of the output device 26.

In this manner, according to the wireless communication system 1A according to the first modification of the first embodiment, it is possible to achieve the same operation and effect as those in the wireless communication system 1 according to the first embodiment.

Further, according to the wireless communication system 1A, it is possible to allow the user of each user terminal 20A to check the sum of the amounts of power supplied to the external device 40 associated with the user terminal 20A.

In addition, the information on the amount of power supply for each user may include information indicating the amount of power supplied to each of the external devices 40 associated with the user terminal 20A (for example, information for each external device 40). Further, information on the amount of power supply for each user may include information indicating an electric charge which is calculated based on an amount of power. Further, information on the amount of power supply for each user may include information indicating the amount (for example, an accumulated value) of power supplied within a predetermined period (for example, for one day, for one week, for one month, for one year, or the like).

Second Modification of First Embodiment

Next, a wireless communication system according to a second modification of the first embodiment of the embodiments will be described. The wireless communication system according to the second modification of the first embodiment is different from the wireless communication system according to the first embodiment in that whether or not to control the amount of power supplied to a plurality of external devices is determined based on whether or not the user terminal is located within a predetermined communication area. Following description will be made focused on the difference. In addition, in the description of the second modification, those denoted by the same reference numeral as those used in the first embodiment are the same or substantially the same.

Figure 13:
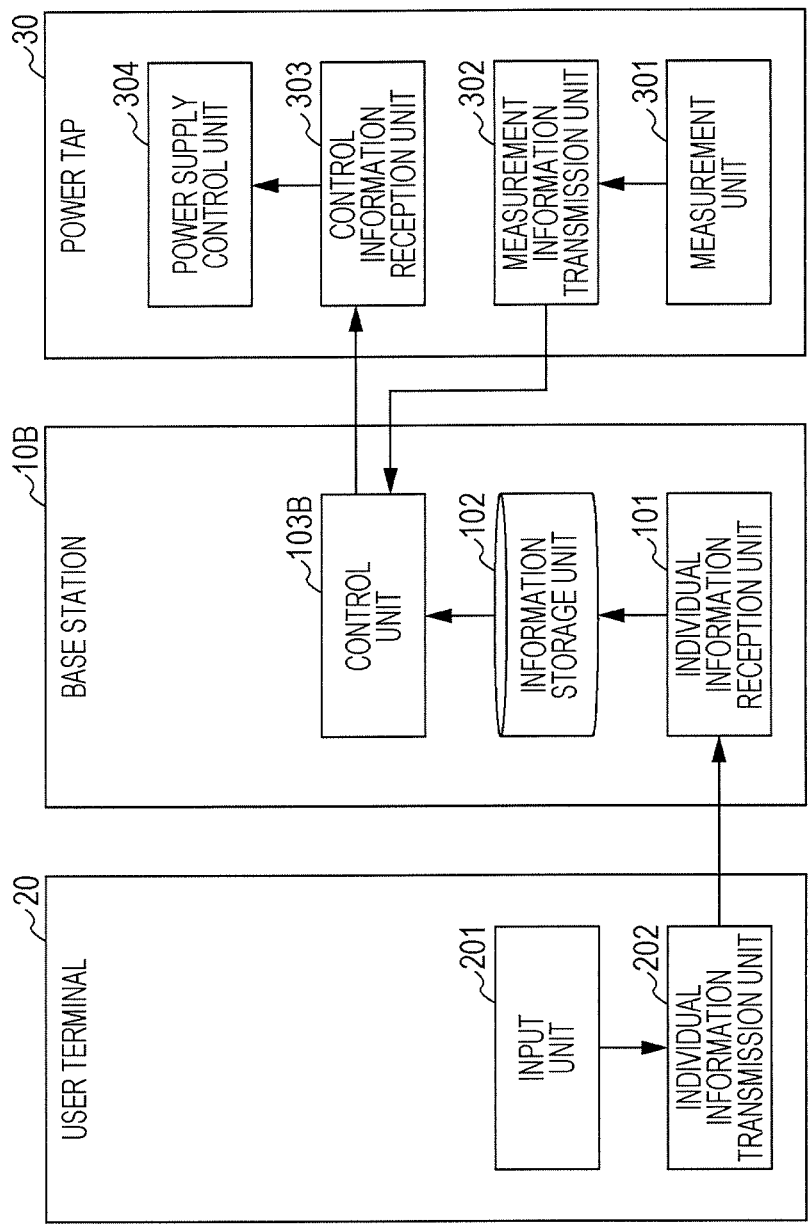
FIG. 13 is a diagram illustrating a function of a wireless communication system as an example of a second modification of the first embodiment.

As illustrated in FIG. 13, a wireless communication system 1B according to the second modification includes a base station 10B instead of the base station 10 according to the first embodiment. The function of the base station 10B is a function obtained by replacing the control unit 103 of the function of the base station 10 according to the first embodiment with a control unit 103B.

The control unit 103B has the same function as that of the control unit 103 other than a function of determining whether the amount of power in the power tap 30 is to be reduced and a function of selecting an outlet unit 31 of which the supply of power is to be controlled. Hereinafter, the control unit 103B will be described focused on the difference with the control unit 103.

The control unit 103B acquires the presence or absence information. The presence or absence information is information indicating whether or not the user terminal 20 is located within a predetermined communication area. In the present example, the presence or absence information is communication availability information indicating whether or not the base station 10B is able to communicate with the user terminal 20.

For example, the control unit 103B acquires the communication availability information based on a reception intensity of wireless signals received by the base station 10B from the user terminal 20. For example, when the reception intensity is greater than a predetermined threshold, the control unit 103B may acquire communication availability information indicating that the base station 10B is able to communicate with the user terminal 20. In contrast, when the reception intensity is a predetermined threshold or less, the control unit 103B acquires communication availability information indicating that the base station 10B is not able to communicate with the user terminal 20.

In addition, the presence or absence information may be position specific information for specifying the position of the user terminal 20 (for example, a tracking area code (TAC)). In this case, the control unit 103B may acquire the position specific information through a communication network NW. Further, the base station 10B may include a human sensor, and use information indicating the result of detection by the human sensor as the presence or absence information.

The control unit 103B uses the total information and the presence or absence information as the entirety of information. Specifically, the control unit 103B determines that the amount of power in the power tap 30 is not to be reduced, when both a first condition and a second condition are established. The first condition is a condition in which at least one user terminal 20 is located within a communication area, as indicated by the presence or absence information. The second condition is a condition in which the sum of the amounts of power supply is smaller than a predetermined supply amount threshold.

In contrast, when at least one of the first condition and the second condition is not established, the control unit 103B determines that the amount of power in the power tap 30 is to be reduced.

When the first condition is established and the second condition is not established, the control unit 103B selects an outlet unit 31 similarly to the control unit 103.

Further, when the first condition is not established, the control unit 103B selects an outlet unit 31 which is associated with the control availability information indicating that the supply of power may be controlled and is specified by a set of the tap identification information and the outlet identification information. For example, in the present example, when the user terminal is not located within the communication area, the control unit 103B may select a higher number of outlet units 31 than the number selected when the user terminal is located within the communication area.

Next, an operation of the wireless communication system 1B according to the second modification of the first embodiment will be described with reference to FIG. 14.

Figure 14:
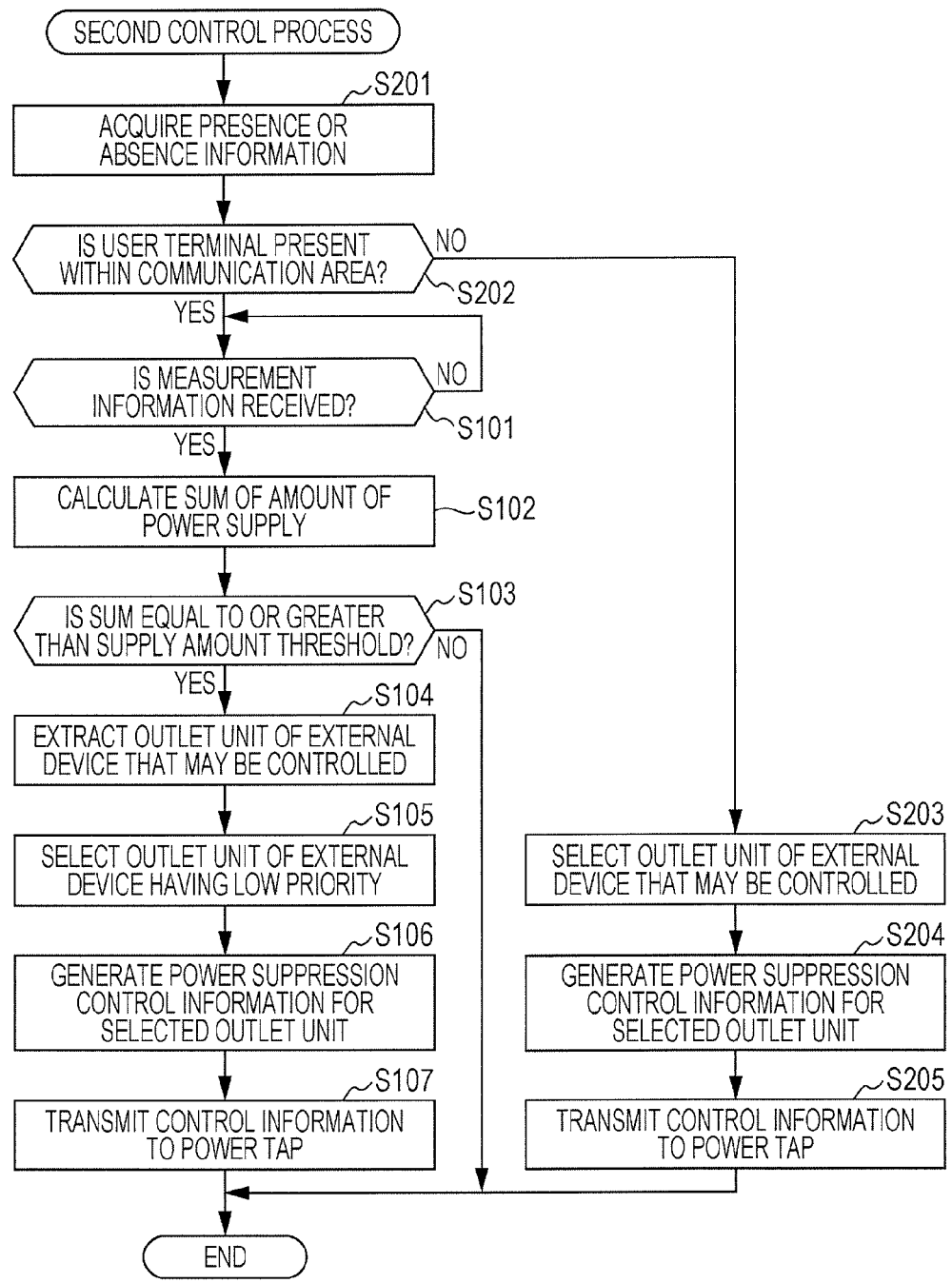
FIG. 14 is a flowchart illustrating a second control process performed by a base station as an example of the second modification of the first embodiment.

The base station 10B performs the second control process illustrated in FIG. 14, instead of the first control process illustrated in FIG. 8. The second control process illustrated in FIG. 14 is a process in which a process of steps S201 to S205 is added to the first control process illustrated in FIG. 8.

First, the base station 10B acquires the presence or absence information (step S201 in FIG. 14). Next, the base station 10B determines whether or not at least one user terminal 20 is located within a communication area, based on the acquired presence or absence information (step S202 in FIG. 14).

When at least one user terminal 20 is located within the communication area, the base station 10B makes a determination of "Yes" and proceeds to step S101, and performs process of steps S101 to S107 similarly to the first embodiment.

In contrast, when any user terminal 20 is not located within the communication area, the base station 10B makes a determination of "No" in step S202 and proceeds to step S203.

Then, the base station 10B selects all outlet units 31 of the external device 40 that may be controlled. For example, base station 10B may select all outlet units 31 which are associated with the control availability information indicating that the supply of power may be controlled and specified by a set of the tap identification information and the outlet identification information.

Next, the base station 10B generates power suppression control information for the selected outlet unit 31 (step S204 in FIG. 14). In the present example, the base station 10B generates power suppression control information for the outlet unit 31 included in the power tap 30, in association with each of the power taps 30 having the selected outlet unit 31.

Next, the base station 10B transmits each piece of the generated control information (power suppression control information) to the power tap 30 associated with the control information (step S205 in FIG. 14). Then, the base station 10B completes the second control process of FIG. 14.

For example, when the user terminal 20 (for example, the user of user terminal 20) is not located within a wireless communication service zone (communication area) provided by the base station 10B, in many cases, power is not to be supplied to the external device 40. According to the wireless communication system 1B according to the second modification of the first embodiment, it is possible to suppress the supply of power to the external device 40, in this case. As a result, it is possible to appropriately control the supply of power to the external devices 40 depending on the usage status of all of the plurality of external devices 40.

According to the wireless communication system 1B according to the second modification of the first embodiment, it is possible to achieve the same operation and effect as those in the wireless communication system 1 according to the first embodiment.

In addition, when there are the user terminal 20 located within the communication area and the user terminal 20 which is not located within the communication area, the base station 10B may preferentially select the outlet unit 31 associated with the user terminal 20 which is not located within the communication area.

Second Embodiment

Next, a wireless communication system according to a second embodiment of the embodiments will be described. The wireless communication system according to the second embodiment is different from the wireless communication system according to the first embodiment in that a third process based on whether the user terminal is located within a predetermined communication area is performed. Following description will be made focused on the difference. In addition, in the description of the second embodiment, those denoted by the same reference numeral as those used in the first embodiment are the same or substantially the same.

Figure 15:
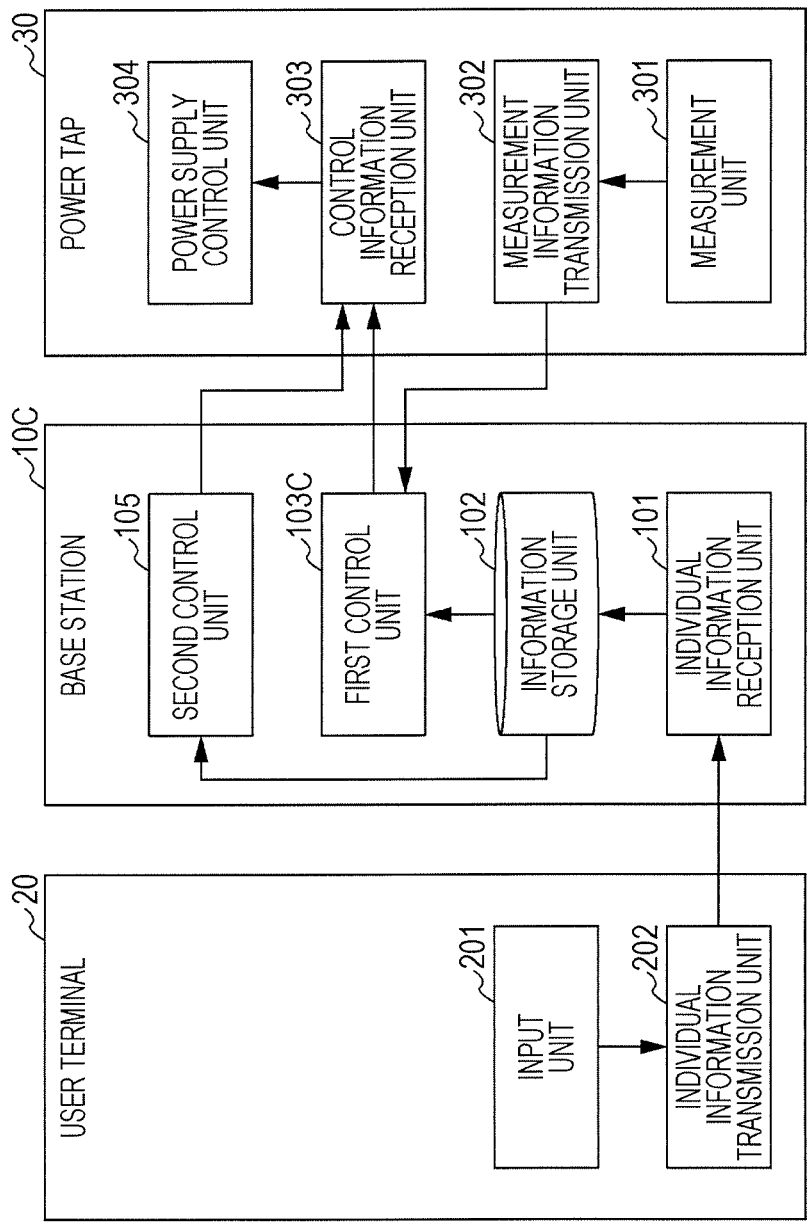
FIG. 15 is a diagram illustrating a function of a wireless communication system as an example of a second embodiment.

As illustrated in FIG. 15, a wireless communication system 1C according to the second embodiment includes a base station 10C instead of the base station 10 according to the first embodiment. The function of the base station 10C is a function obtained by replacing the control unit 103 of the function of the base station 10 according to the first embodiment with a first control unit 103C and adding a second control unit 105. In addition, the second control unit 105 is an example of a determination unit.

The first control unit 103C includes the same function as that of the control unit 103.

The second control unit 105 acquires the presence or absence information. The presence or absence information is information indicating whether or not the user terminal 20 is located within a predetermined communication area (in the present example, wireless communication service zone). In the present example, the presence or absence information is communication availability information indicating whether or not the base station 10C is able to communicate with the user terminal 20. For example, the second control unit 105 acquires the communication availability information based on a reception intensity of wireless signals received by the base station 10C from the user terminal 20.

In addition, the presence or absence information may be position specific information for specifying the position of the user terminal 20 (for example, a TAC). In this case, the second control unit 105 may acquire the position specific information through a communication network NW. Further, the base station 10C may include a human sensor, and use information indicating the result of detection by the human sensor as the presence or absence information.

When the acquired presence or absence information indicates that at least one user terminal 20 is located within a communication area, the second control unit 105 determines that the amount of power in the power tap 30 is not to be reduced. In contrast, when the acquired presence or absence information indicates that any user terminal 20 is not located within the communication area, the second control unit 105 determines that the amount of power in the power tap 30 is to be reduced.

The second control unit 105 selects at least one outlet unit 31 among a plurality of outlet units 31, based on the individual information stored in the information storage unit 102.

In the present example, the second control unit 105 selects all outlet units 31 specified by a set of the tap identification information and the outlet identification information which are associated with the control availability information indicating that the supply of power may be controlled. For example, the selected outlet unit 31 may be the outlet unit 31 which is connected to the external device 40 to which supply of power may be controlled as indicated by the control availability information.

When it is determined that the amount of power in the power tap 30 is to be reduced, the second control unit 105 generates control information used to control the supply of power to the external device 40 connected to the selected outlet unit 31. In the present example, the second control unit 105 generates control information for the outlet unit 31 included in the power tap 30, in association with each of the power taps 30 having the selected outlet unit 31.

In the present example, the control information is power suppression control information. The power suppression control information includes outlet identification information for identifying the selected outlet unit 31 and a switching instruction to instruct a switching of the state of the outlet unit 31 to the suppression state.

The second control unit 105 transmits each piece of the generated control information to the power tap 30 associated with the control information.

Next, an operation of the wireless communication system 1C according to the second embodiment will be described with reference to FIG. 16.

Figure 16:
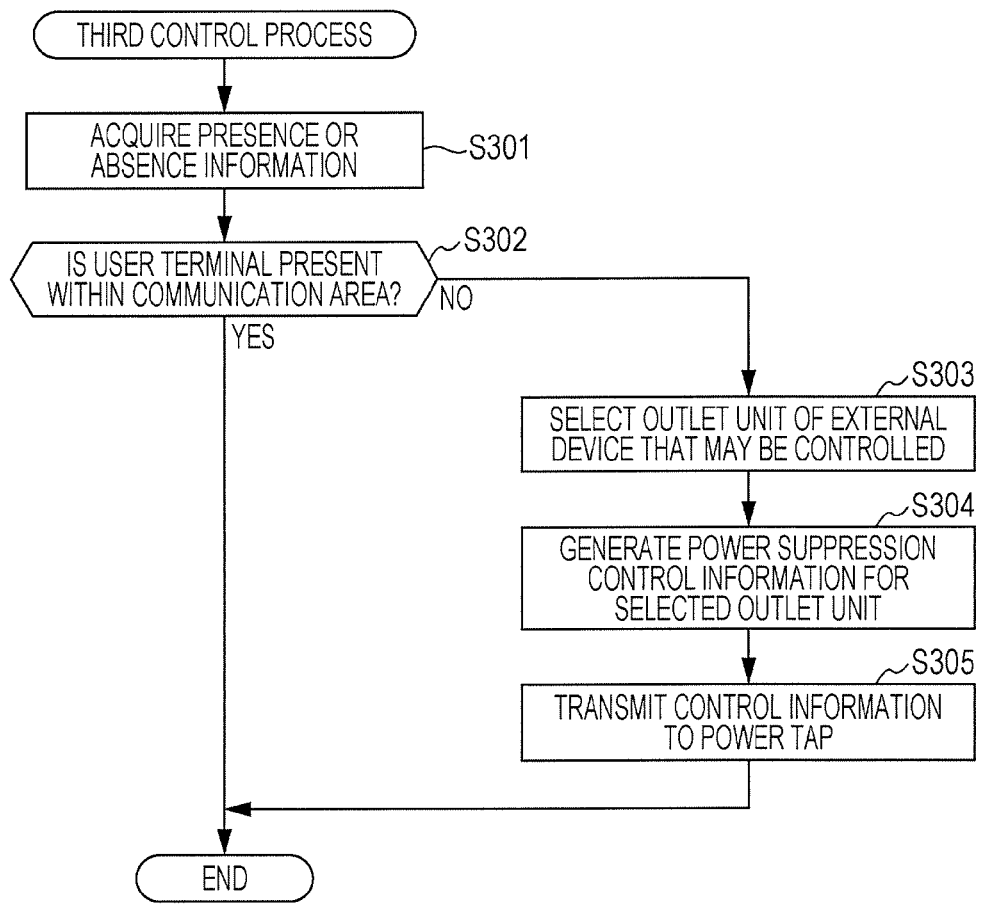
FIG. 16 is a flowchart illustrating a third control process performed by a base station as an example of the second embodiment.

The base station 10C performs the third control process illustrated in FIG. 16, in addition to the first control process illustrated in FIG. 8, each time a predetermined execution period elapses.

First, the base station 10C acquires the presence or absence information (step S301 in FIG. 16). Next, the base station 10C determines whether or not at least one user terminal 20 is located within a communication area, based on the acquired presence or absence information (step S302 in FIG. 16).

When any user terminal 20 is not located within the communication area, the base station 10C makes a determination of "No" and proceeds to step S303. In addition, the determination of "No" in step S302 is an example of the determination that the amount of power in the power tap 30 is to be reduced.

Then, the base station 10C selects all outlet units 31 of the external device 40 that may be controlled. For example, the base station 10C may select all outlet units 31 specified by a set of the tap identification information and the outlet identification information which are associated with the control availability information indicating that the supply of power may be controlled.

Next, the base station 10C generates power suppression control information for the selected outlet units 31 (step S304 in FIG. 16). In the present example, the base station 10C generates power suppression control information for the outlet units 31 included in the power tap 30 in association with each of the power taps 30 having the selected outlet units 31.

Next, the base station 10C transmits each piece of the generated control information (power suppression control information) to the power tap 30 associated with the control information (step S305 in FIG. 16). Then, the base station 10C completes the third control process of FIG. 16.

In contrast, when at least one user terminal 20 is located within the communication area, the base station 10C makes a determination of "Yes" in step S302, and completes the third control process of FIG. 16. In addition, the determination of "Yes" in step S302 is an example of the determination that the amount of power in the power tap 30 is not to be reduced.

As described above, according to the wireless communication system 1C according to the second embodiment, it is possible to achieve the same operation and effect as that of the wireless communication system 1 according to the first embodiment.

Further, the base station 10C according to the second embodiment determines whether or not the amount of power in the power tap 30 is to be reduced, based on the presence or absence information indicating whether or not the user terminal 20 is located within a wireless communication service zone provided by the base station 10.

For example, when the user terminal 20 (for example, the user of the user terminal 20) is not located within a wireless communication service zone, in many cases, power is not to be supplied to the external device 40. According to the wireless communication system 1C according to the second embodiment, it is possible to suppress the supply of power to the external device 40 in this case. As a result, it is possible to appropriately control the supply of power to the external devices 40 depending on the usage status of all of the plurality of external devices 40.

In addition, the individual information may include a plurality of pieces of control availability information (for example, first control availability information and second control availability information). In this case, it is preferable that the base station 10C select the outlet unit 31 based on the first control availability information in the first control process, and select the outlet unit 31 based on the second control availability information in the third control process.

Further, the base station 10C according to the second embodiment may be configured not to perform the first control process illustrated in FIG. 8.

First Modification of Second Embodiment

Next, a wireless communication system according to a first modification of the second embodiment of the embodiments will be described. The wireless communication system according to the first modification of the second embodiment is different from the wireless communication system according to the second embodiment in that, even when the user terminal is located within a predetermined communication area, the amount of power supplied to a plurality of external devices is controlled. Following description will be made focused on the difference. In addition, in the description of the first modification, those denoted by the same reference numeral as those used in the second embodiment are the same or substantially the same.

Figure 17:
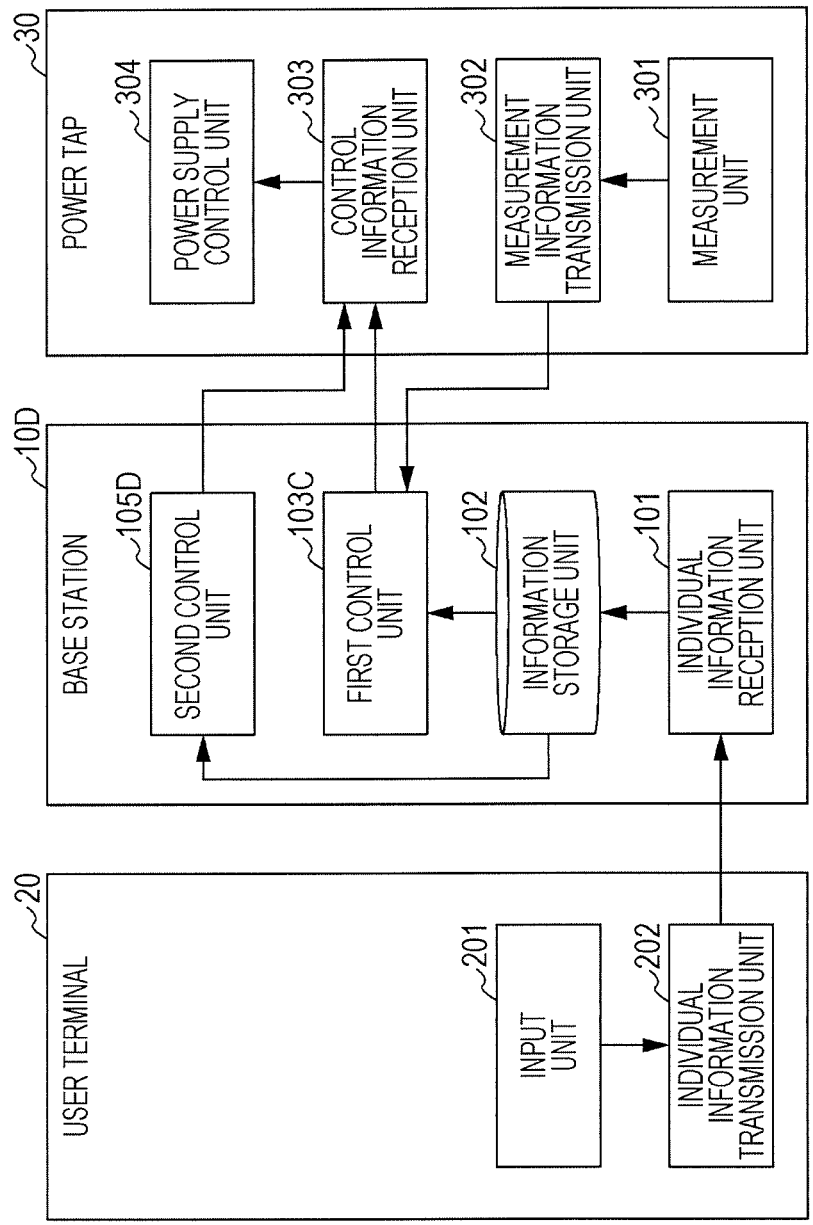
FIG. 17 is a diagram illustrating a function of a wireless communication system as an example of a first modification of the second embodiment.

As illustrated in FIG. 17, a wireless communication system 1D according to the first modification includes a base station 10D instead of the base station 10C according to the second embodiment. The function of the base station 10D is a function obtained by replacing the second control unit 105 of the function of the base station 10C according to the second embodiment with a second control unit 105D.

The second control unit 105D has the same function as that of the second control unit 105 other than a function of determining whether the amount of power in the power tap 30 is to be reduced and a function of generating control information. Hereinafter, the second control unit 105D will be described focused on the difference with the second control unit 105.

When the acquired presence or absence information indicates that at least one user terminal 20 is located within a communication area, the second control unit 105D determines that the amount of power in the power tap 30 is not to be increased (to increase the amount of power supplied to a plurality of external devices 40). Similarly, when the acquired presence or absence information indicates that any user terminal 20 is not located within the communication area, the second control unit 105D determines that the amount of power in the power tap 30 is to be reduced.

The second control unit 105D selects at least one outlet unit 31 among a plurality of outlet units 31, based on the individual information stored in the information storage unit 102.

In the present example, the second control unit 105D selects all outlet units 31 specified by a set of the tap identification information and the outlet identification information which are associated with the control availability information indicating that the supply of power may be controlled. For example, the selected outlet unit 31 may be the outlet unit 31 connected to the external device 40 to which supply of power may be controlled as indicated by the control availability information.

When it is determined that the amount of power supplied to a plurality of external devices 40 is to be increased, the second control unit 105D generates the power supply control information for starting supply of power to the external device 40 connected to the selected outlet unit 31. The power supply control information includes outlet identification information for identifying the selected outlet unit 31 and a switching instruction to instruct a switching of the state of the outlet unit 31 to the supply state.

When it is determined that the amount of power in the power tap 30 is to be reduced, the second control unit 105D generates power suppression control information for controlling the amount of power supplied to the external device 40 connected to selected outlet unit 31. The power suppression control information includes outlet identification information for identifying the selected outlet unit 31 and a switching instruction to instruct a switching of the state of the outlet unit 31 to the suppression state.

Next, an operation of a wireless communication system 1D according to a first modification of the second embodiment will be described with reference to FIG. 18.

Figure 18:
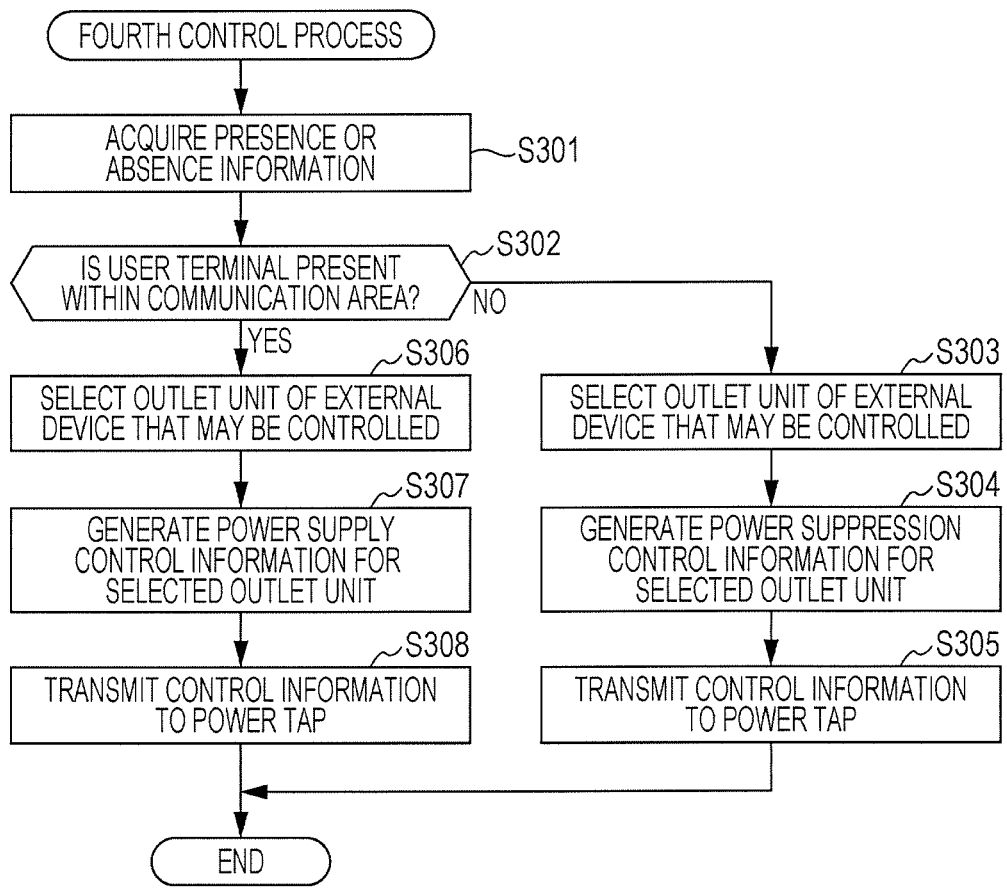
FIG. 18 is a flowchart illustrating a fourth control process performed by a base station as an example of the first modification of the second embodiment.

The base station 10D performs a fourth control process illustrated in FIG. 18 instead of the third control process illustrated in FIG. 16. The fourth control process illustrated in FIG. 18 is a process made by adding a process of steps S306 to S308 to the third control process illustrated in FIG. 16.

First, the base station 10D performs a process of steps S301 and S302 similarly to the second embodiment.

When any user terminal 20 is not located within a communication area (wireless communication service zone), the base station 10D makes a determination of "No", and similarly to the second embodiment, performs a process of steps S303 to S305.

In contrast, when at least one user terminal 20 is located within the communication area, the base station 10D makes a determination of "Yes" in step S302 and proceeds to step S306. Then, the base station 10D selects all outlet units 31 of the external device 40 that may be controlled. For example, the base station 10D may select all outlet units 31 specified by a set of the tap identification information and the outlet identification information which are associated with the control availability information indicating that the supply of power may be controlled.

Next, the base station 10D generates power supply control information for the selected outlet unit 31 (step S307 in FIG. 18). In the present example, the base station 10D generates power supply control information for the outlet units 31 included in the power tap 30, in association with each of the power taps 30 having the selected outlet units 31.

Next, the base station 10D transmits each piece of the generated control information (power supply control information) to the power tap 30 associated with the control information (step S308 in FIG. 18). Then, the base station 10D completes the fourth control process of FIG. 18.

For example, when the user terminal 20 (for example, the user of the user terminal 20) is located within a wireless communication service zone provided by the base station 10D, in many cases, power is not to be supplied to the external device 40. According to the wireless communication system 1D according to the first modification of the second embodiment, it is possible to start the supply of power to the external device 40 in this case. As a result, it is possible to appropriately control the supply of power to the external devices 40 depending on the usage status of all of the plurality of external devices 40.

According to the wireless communication system 1D according to the first modification of the second embodiment, it is possible to achieve the same operation and effect as those in the wireless communication system 1C according to the second embodiment.

In addition, the base station 10D according to the first modification of the second embodiment may be configured so as not to perform the first control process illustrated in FIG. 8.

Further, the base station 10D may be configured to determine that the amount of power in the power tap 30 is not to be reduced when any user terminal 20 is not located within the communication area (wireless communication service zone). For example, in this case, the base station 10D may omit the process of steps S303 to S305, in the fourth control process illustrated in FIG. 18.

Third Embodiment

Next, a wireless communication system according to a third embodiment of the embodiments will be described. The wireless communication system according to the third embodiment is different from the wireless communication system according to the first embodiment in that when an emergency information broadcast instruction is received, the amount of power supplied to a plurality of external devices is controlled. Following description will be made focused on the difference. In addition, in the description of the third embodiment, those denoted by the same reference numeral as those used in the first embodiment are the same or substantially the same.

Figure 19:
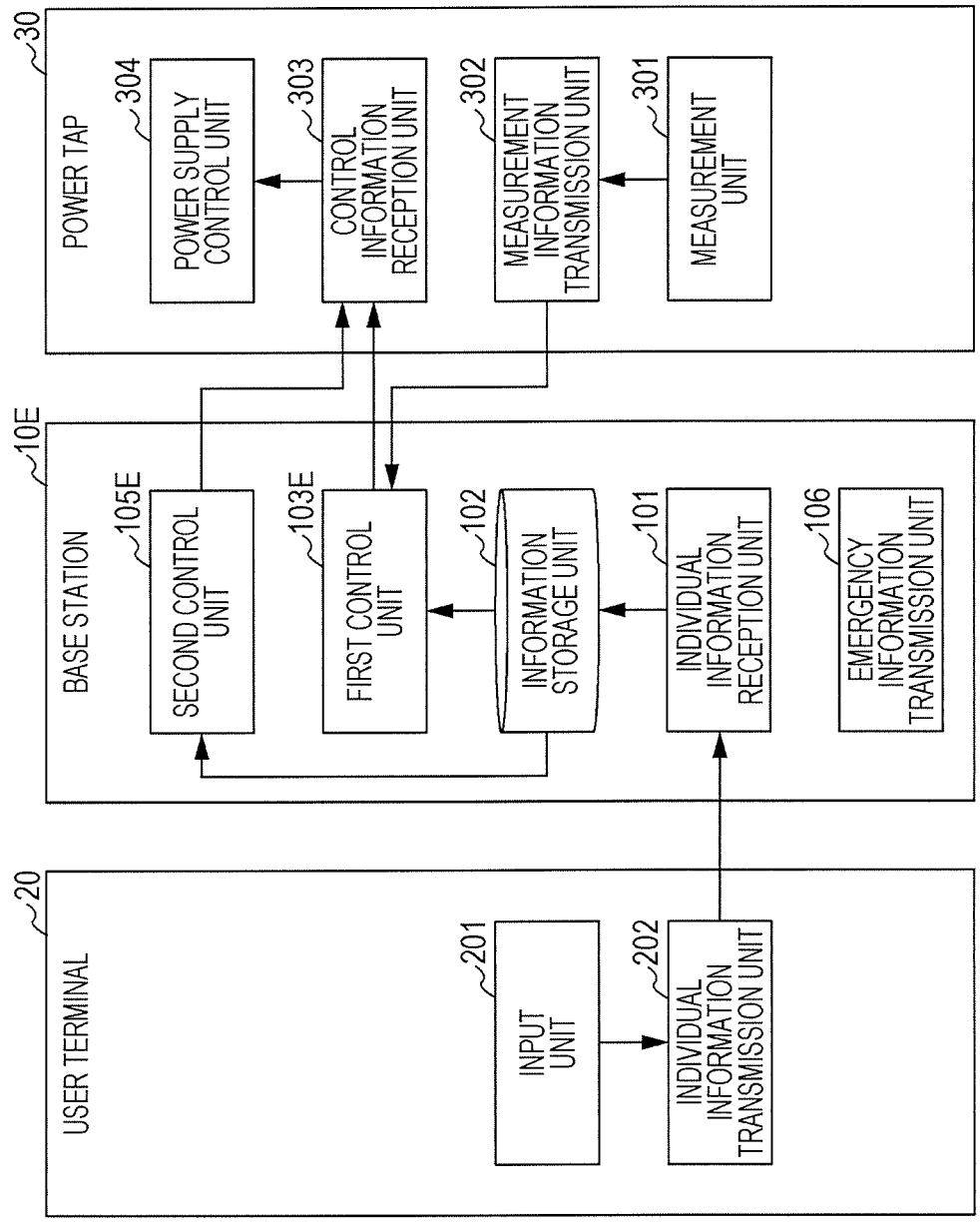
FIG. 19 is a diagram illustrating a function of a wireless communication system as an example of a third embodiment.

As illustrated in FIG. 19, the wireless communication system 1E according to the third embodiment includes a base station 10E instead of the base station 10 according to the first embodiment. The function of the base station 10E is a function obtained by replacing the control unit 103 of the function of the base station 10 according to the first embodiment with the first control unit 103E and adding a second control unit 105E and an emergency information transmission unit 106. In addition, the second control unit 105E is an example of a determination unit.

When the emergency information broadcast instruction is received by the wired communication module 15 through the communication network NW from the host apparatus, the emergency information transmission unit 106 performs a broadcasting process to the user terminal 20 located (present) within the wireless communication service zone provided by the base station 10E. The broadcasting process is a process that broadcasts the emergency information. The emergency information broadcast instruction is information to instruct an execution of the emergency information broadcast. In the present example, the emergency information transmission unit 106 broadcasts emergency information by using the second wireless communication module 14 (that is, according to the second wireless communication method).

In the present example, the emergency information broadcast instruction is a signal that prompts starting the execution of the process that broadcasts the emergency information to the user terminal 20 located (present) within the wireless communication service zone provided by the base station 10E. For example, the emergency information broadcast instruction is a signal (write-replace warning request (see 3GPP TS 36.413)) according to Earthquake and Tsunami Warning System (ETWS) scheme.

For example, the base station 10E may receive an emergency information broadcast instruction (write-replace warning request) which is distributed through a communication node (for example, CBC) on the communication network NW, by the wired communication module 15. For example, see 9.1.3.4.2 Section of 3GPP TS 23.041. CBC is an abbreviation of Cell Broadcast Centre.

For example, the communication node on a communication network NW (for example, CBC) receives a delivery request of emergency information from a supply apparatus (for example, CBE) which is operated by a local government and a government. CBE is an abbreviation of Cell Broadcast Entity. Then, the communication node (for example, CBC) on the communication network NW may distribute an emergency information broadcast instruction to a base station 10E (for example, HeNB) through another communication node (for example, a MME, a HeNB-GW, or the like) on the communication network NW. MME is an abbreviation of Mobility Management Entity. HeNB is an abbreviation of Home eNB. HeNB-GW is an abbreviation of Home eNB Gateway.

The first control unit 103E has the same function as that of the control unit 103.

When the emergency information broadcast instruction is received by the wired communication module 15 through the communication network NW from the host apparatus, the second control unit 105E performs a process regarding control of supply of power to the external device 40. In the present example, in this case, the second control unit 105E determines that the amount of power in the power tap 30 is to be reduced. In the present example, the second control unit 105E uses the received emergency information broadcast instruction as the entirety of information. The second control unit 105E determines whether or not the amount of power in the power tap 30 is to be reduced, based on the presence or absence of reception of the emergency information broadcast instruction.

When the emergency information broadcast instruction is received, for example, the second control unit 105E determines whether or not the contents of the emergency information give notice of a disaster for the region in which the base station 10E is provided. For example, when it is determined that the contents give notice of a disaster for the region, the second control unit 105E determines that the amount of power in the power tap 30 is to be reduced.

In contrast, when the emergency information broadcast instruction is not received and it is determined that the contents of the emergency information do not give notice of a disaster for the region, the second control unit 105E determines that the amount of power in the power tap 30 is not to be reduced. Further, the second control unit 105E may determine whether or not the amount of power in the power tap 30 is to be reduced, based on the degree of a disaster which is given by the contents of the emergency information. For example, when the contents of the emergency information give notice of a strong earthquake (for example, seismic intensity 6 or more, or the like) in the region in which the base station 10E is provided, the second control unit 105E may be configured to determine that the amount of power in the power tap 30 is to be reduced.

The second control unit 105E selects at least one outlet unit 31 of the plurality of outlet units 31 based on the individual information stored in the information storage unit 102.

In the present example, the second control unit 105E selects all outlet units 31 specified by a set of the tap identification information and the outlet identification information which are associated with the control availability information indicating that the supply of power may be controlled. For example, the selected outlet unit 31 may be the outlet unit 31 which is connected to the external device 40 to which supply of power may be controlled as indicated by the control availability information.

When it is determined that the amount of power in the power tap 30 is to be reduced, the second control unit 105E generates control information used to control the supply of power to the external device 40 connected to the outlet unit 31 from the selected outlet unit 31. In the present example, the second control unit 105E generates control information for the outlet unit 31 included in the power tap 30, in association with each of the power taps 30 having the selected outlet unit 31.

In the present example, the control information is power suppression control information. The power suppression control information includes outlet identification information for identifying the selected outlet unit 31, and a switching instruction to instruct a switching of the state of the outlet unit 31 to the suppression state.

The second control unit 105E transmits each of the generated control information to the power tap 30 associated with the control information. In the present example, the second control unit 105E transmits control information by using the first wireless communication module 13 (that is, according to the first wireless communication method).

In the present example, the second control unit 105E transmits control information to each of the power taps 30 by performing the broadcasting process. According to this, it is possible to rapidly transfer the control information to each of the plurality of power taps 30.

In addition, the second control unit 105E may transmit control information to each of the power taps 30 by communication other than broadcasting (for example, broadcast communication, or the like).

Next, the operation of the wireless communication system 1E according to the third embodiment will be described with reference to FIG. 20.

Figure 20:
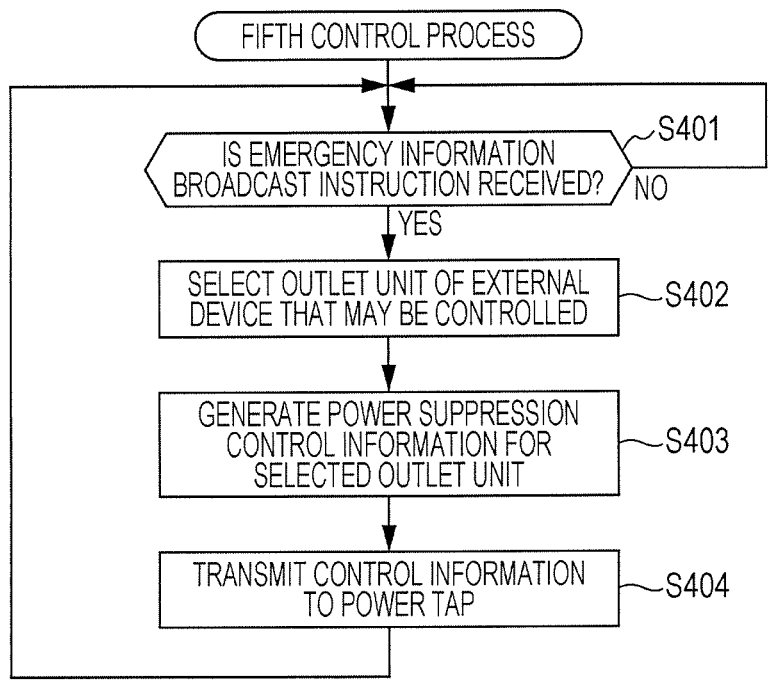
FIG. 20 is a flowchart illustrating a fifth control process performed by a base station as an example of the third embodiment.

The base station 10E performs the fifth control process illustrated in FIG. 20, in addition to the first control process illustrated in FIG. 8.

The base station 10E is on standby until the emergency information broadcast instruction is received (step S401 in FIG. 20). Then, if the emergency information broadcast instruction is received, the base station 10E makes a determination of "Yes", and selects all outlet units 31 of the external device 40 which may be controlled (step S402 in FIG. 20).

Next, the base station 10E generates power suppression control information for the selected outlet unit 31 (step S403 in FIG. 20). In the present example, the base station 10E generates power suppression control information for the outlet unit 31 included in the power tap 30, in association with each of the power taps 30 having the selected outlet unit 31.

Next, the base station 10E transmits each of the generated control information (power suppression control information) to the power tap 30 associated with the control information (step S404 in FIG. 20). Then, the base station 10E returns to step S401, and performs repeatedly the process of steps S401 to S404.

Hitherto, as described above, according to the wireless communication system 1E according to the third embodiment, it is possible to achieve the same operation and effect as those in the wireless communication system 1 according to the first embodiment.

Further, when the emergency information broadcast instruction is received through the communication network NW connected to the base station 10E, the base station 10E according to the third embodiment determines that the amount of power in the power tap 30 is to be reduced.

According to this, when the emergency information broadcast instruction is received, the base station 10E may appropriately reduce the supply of power to the external device 40. However, for example, when a disaster occurs, the base station 10E tends to receive the emergency information broadcast instruction. According to the configuration, in such as case, it is possible to reduce the supply of power to the external device 40. As a result, it is possible to suppress the occurrence of damage (that is, secondary disaster) resulting from the external device 40.

Further, in the wireless communication system 1E according to the third embodiment, the emergency information transmission unit 106 performs the emergency information broadcast process by using the second wireless communication module 14. In contrast, the second control unit 105E transmits control information to the power tap 30 by using the first wireless communication module 13.

According to this, the base station 10E may simultaneously perform the emergency information broadcast and the transmission of the control information. Thus, it is possible to rapidly convey both the emergency information and the control information.

In addition, when the emergency information broadcast instruction is received, the base station 10E may select all outlet units 31 not based on the control availability information.

Further, the base station 10E may be configured not to perform the first control process illustrated in FIG. 8.

Further, when the emergency information broadcast instruction is received, the base station 10E may be configured to transmit the power supply control information instead of the power suppression control information. Further, the base station 10E may be configured to select the power suppression control information or the power supply control information, based on information included in the emergency information broadcast instruction (for example, information indicating a type of the emergency information broadcast instruction, or the like) and to transmit the selected control information.

Further, although the power tap 30 includes the wireless communication module 33 which performs communication according to the first wireless communication method, it may include a wireless communication module which performs communication according to a second wireless communication method, instead of the wireless communication module 33 or in addition to the wireless communication module 33. In this case, when the emergency information broadcast instruction is received, the emergency information transmission unit 106 may perform an emergency information broadcast to the power tap 30 located within the wireless communication service zone. Further, in this case, the second control unit 105E may transmit the control information included in the emergency information.

Hitherto, although the embodiments are described with reference to the embodiment, the embodiments are not limited to the embodiment described above. The configurations and details of the embodiments may be changed in various ways in which those skilled in the art may understand in the scope of the embodiments.

The wireless communication system may include a plurality of base stations including a first base station and a second base station. In this case, when the base station to be connected the user terminal is changed to the second base station from the first base station (for example, a handover is performed), the first base station may transmit individual information and measurement information to the second base station.

In addition, in each embodiment, each function of each apparatus is implemented by hardware such as circuits. However, each apparatus may be configured to implement each function by each apparatus including a computer that includes a process apparatus and a storage device for storing a program (software), and the process apparatus executing the program. In this case, the program may be stored in a computer-readable recording medium. For example, the recording medium is a portable medium such as flexible disk, an optical disk, a magneto-optical disk, and a semiconductor memory.

Further, in the scope without departing from the spirit of the embodiments, any combination of the embodiments and the modifications which are described above may be employed as another modification of the embodiments.

In addition, in each embodiment, when it is determined that the amount of power in the power tap 30 is to be reduced, the base station 10 may transmit control information used to control supply of power from all outlet units 31 included in the power tap 30 to the power tap 30.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising a wireless base station apparatus and a terminal device capable of communicating with the wireless base station apparatus,
   wherein the wireless base station apparatus includes
   a measurement information reception unit configured to receive measurement information indicating a measurement value acquired in the terminal device;
   a determination unit configured to make a determination as to whether an amount of power in the terminal device is to be reduced; and
   a control information transmission unit configured to transmit control information indicating power control to the terminal device, based on a determination result of the determination unit, and
   wherein the terminal device includes
   at least one outlet unit configured to be able to supply power to an external device;
   a measurement unit configured to acquire the measurement value by measuring power in the terminal device;
   a measurement information transmission unit configured to transmit the measurement information indicating the measurement value acquired by the measurement unit to the wireless base station apparatus;
   a control information reception unit configured to receive the control information from the wireless base station apparatus; and
   a power supply control unit configured to control supply of power from the outlet unit, based on the received control information.

2. The wireless communication system according to claim 1,
   wherein the terminal device includes a plurality of the outlet units, and
   wherein when the determination unit determines that an amount of power in the terminal device is to be reduced, the control information transmission unit selects at least one outlet unit among the plurality of outlet units, based on individual information associated with corresponding one of the plurality of outlet units included in the terminal device, and transmits control information to be used to control supply of power from the selected outlet unit.

3. The wireless communication system according to claim 2,
   wherein the measurement unit acquires, for each of the plurality of outlet units, the measurement value by measuring the amount of power supply which is the amount of power to be supplied to the external device from the outlet unit, and wherein the determination unit acquires the sum of the amount of power supply for the plurality of outlet units included in the terminal device, from the measurement information received from the terminal device, and makes a determination based on the sum.

4. The wireless communication system according to claim 3,
wherein when the sum of the amount of power supply is a predetermined threshold or more, the determination unit determines that the amount of power in the terminal device is to be reduced, and when the sum is smaller than the threshold, the determination unit determines that the amount of power in the terminal device is not to be reduced.

5. The wireless communication system according to claim 2,
wherein the individual information includes priority information indicating a degree to which the supply of power to the external device is prioritized, and
wherein the control information transmission unit preferentially selects an outlet unit connected to an external devices having a low priority as indicated by the priority information.

6. The wireless communication system according to claim 2,
wherein the individual information includes information on a maximum amount of power indicating a maximum amount of power which is a maximum value of the amount of power to be supplied to the external device, and
wherein the control information transmission unit preferentially selects an outlet unit connected to the external device of which the maximum amount of power is high as indicated by the information on a maximum amount of power.

7. The wireless communication system according to claim 1, further comprising:
a wireless communication apparatus configured to be able to communicate with the wireless base station apparatus in a wireless communication service zone provided by the wireless base station apparatus and not to include an outlet unit,
wherein the determination unit performs determination based on presence or absence information indicating whether or not the wireless communication apparatus is located within the wireless communication service zone.

8. The wireless communication system according to claim 1, further comprising:
a wireless communication apparatus configured to be able to communicate with the wireless base station apparatus and not to include an outlet unit,
wherein the wireless base station apparatus further includes
an interface unit configured to be connected to a host apparatus through a communication network; and
an emergency information transmission unit configured to perform an emergency information broadcast process to the wireless communication apparatus, when an emergency information broadcast instruction to instruct an execution of an emergency information broadcast is received from the host apparatus through the interface unit, and
wherein the determination unit determines that an amount of power in the terminal device is to be reduced, when the emergency information broadcast instruction is received from the host apparatus through the interface unit.

9. The wireless communication system according to claim 8,
wherein the wireless base station apparatus further includes
a first wireless communication module corresponding to a first wireless communication method; and
a second wireless communication module corresponding to a second wireless communication method in which wireless communication is performed using a frequency bandwidth that is different from that of the first wireless communication method,
wherein the emergency information transmission unit performs the emergency information broadcast process by using the first wireless communication module, and
wherein the control information transmission unit transmits the control information to the terminal device by using the second wireless communication module.

10. The wireless communication system according to claim 1,
wherein the control information transmission unit acquires reservation information indicating that a predetermined operation of the external device is reserved, and uses the acquired reservation information as individual information.

11. The wireless communication system according to claim 1,
wherein the control information is information for cutting off the supply of power to the external device.

12. The wireless communication system according to claim 1,
wherein the control information is information for reducing an amount of power supplied to the external device.

13. The wireless communication system according to claim 1, further comprising:
at least one wireless communication apparatus configured to be able to communicate with the wireless base station apparatus and not to include an outlet unit,
wherein the wireless communication apparatus includes
an input unit configured to receive individual information which is input from a user; and
an individual information transmission unit configured to transmit the individual information which is received by the input unit to the wireless base station apparatus, and
wherein the wireless base station apparatus further includes
an individual information reception unit configured to receive the individual information from the wireless communication apparatus; and
a storage unit configured to store the received individual information.

14. The wireless communication system according to claim 13,
wherein a plurality of the wireless communication apparatuses are included,
wherein the terminal device includes a plurality of the outlet units,
wherein the measurement unit acquires, for each of the plurality of outlet units, the measurement value by measuring the amount of power supply which is the amount of power to be supplied to the external device from the outlet unit,
wherein the wireless base station apparatus further includes a transmission unit for information on an amount of power supply for each user configured to calculate, for each of the plurality of wireless communication apparatuses, the amount of power supply for each user which is a sum of the amount of power supplied to a corresponding external device associated with individual information transmitted by the wireless communication apparatus, based on the measurement information received from the terminal device, and to transmit information on an amount of power supply for each user indicating the calculated amount of power supply for each user to the wireless communication apparatus, and, wherein each of the wireless communication apparatuses further includes an output unit configured to receive the information on the amount of power supply for each user from the wireless base station apparatus, and to output the received information on the amount of power supply for each user.

15. A non-transitory computer-readable storage medium storing a program causing a computer to operate as a wireless base station apparatus in the wireless communication system according to claim 1.

16. A wireless communication control method applied in a wireless communication system including a wireless base station apparatus and a terminal device capable of communicating with the wireless base station apparatus, causing:

the terminal device to acquire a measurement value by measuring power in the terminal device;

the terminal device to transmit measurement information indicating the acquired measurement value to the wireless base station apparatus;

the wireless base station apparatus to receive the measurement information from the terminal device;

the wireless base station apparatus to make a determination as to whether an amount of power in the terminal device is to be reduced;

the wireless base station apparatus to transmit control information indicating power control for the terminal device, based on a determination result;

the terminal device to receive the control information from the wireless base station apparatus; and the terminal device to control supply of power from at least one outlet unit capable of supplying power to an external device, based on the received control information.

17. The wireless communication control method according to claim 16, further comprising:

selecting at least one outlet unit among a plurality of the outlet units, based on individual information associated with each of the plurality of outlet units included in the terminal device, when determining that the amount of power in the terminal device is to be reduced, and transmitting the control information to be used for controlling the supply of power from the selected outlet unit.

18. The wireless communication control method according to claim 17, further comprising:

acquiring the measurement value by measuring, for each of the plurality of outlet units, the amount of power supply which is the amount of power supplied to the external device from the outlet unit, and acquiring a sum of the amount of power supply for the plurality of outlet units included in the terminal device, from measurement information received from the terminal device and performing the determination based on the sum.

19. The wireless communication control method according to claim 16, further comprising causing the wireless communication apparatus which is able to communicate with the wireless base station apparatus within a wireless communication service zone provided by the wireless base station apparatus and does not include an outlet unit to perform the determination based on presence or absence information indicating whether or not the wireless communication apparatus is located within the wireless communication service zone.

20. The wireless communication control method according to claim 16, further comprising causing the wireless base station apparatus to perform an emergency information broadcast process to a wireless communication apparatus which is able to communicate with the wireless base station apparatus and does not include an outlet unit, when an emergency information broadcast instruction to instruct an execution of an emergency information broadcast is received from a host apparatus through an interface unit which is connected to the host apparatus through a communication network, and to determine in the determination that an amount of power in the terminal device is to be reduced, when the emergency information broadcast instruction is received by the interface unit from the host apparatus.

* * * * *